United States Patent
Madden et al.

(10) Patent No.: US 10,147,957 B2
(45) Date of Patent: Dec. 4, 2018

(54) ELECTROCHEMICAL CELLS HAVING DESIGNED FLOW FIELDS AND METHODS FOR PRODUCING THE SAME

(71) Applicant: Lockheed Martin Energy, LLC, Bethesda, MD (US)

(72) Inventors: Thomas H. Madden, Glastonbury, CT (US); Paravastu Badrinarayanan, Cypress, TX (US); Curtis Warrington, Acton, MA (US); Srivatsava Puranam, Cambridge, MA (US)

(73) Assignee: Lockheed Martin Energy, LLC, Bethesda, MA (US)

( * ) Notice: Subject to any disclaimer, the term of this patent is extended or adjusted under 35 U.S.C. 154(b) by 0 days.

(21) Appl. No.: 15/093,604

(22) Filed: Apr. 7, 2016

(65) Prior Publication Data

US 2017/0294662 A1   Oct. 12, 2017

(51) Int. Cl.
   *H01M 8/0258*   (2016.01)
   *H01M 8/20*     (2006.01)
   (Continued)

(52) U.S. Cl.
   CPC ..... *H01M 8/0258* (2013.01); *H01M 8/04276* (2013.01); *H01M 8/188* (2013.01);
   (Continued)

(58) Field of Classification Search
   CPC .... H01M 8/0258; H01M 4/8647; H01M 4/88; H01M 8/04276; H01M 8/188; H01M 8/20; H01M 8/2455
   See application file for complete search history.

(56) References Cited

U.S. PATENT DOCUMENTS 3,779,813 A   12/1973   Rabut
4,075,401 A   2/1978   Miyagawa
(Continued)

FOREIGN PATENT DOCUMENTS

CN    103187551 A       7/2013
DE    10-2011-120802 A1 6/2013
(Continued)

OTHER PUBLICATIONS

R.K. Sen, et al., "Metal-Air Battery Assessment," U.S. Department of Energy Report for Contract DE-AC06-76RL01830, May 1988, 84 pages.
(Continued)

*Primary Examiner* — Stewart A Frasner
*Assistant Examiner* — Rachel L Zhang
(74) *Attorney, Agent, or Firm* — Baker & Hostetler LLP

(57) ABSTRACT

Electrochemical cells can include flow channels designed to provide an electrolyte solution more efficiently to an electrode or ionically conductive separator. Such electrochemical cells can include an ionically conductive separator disposed between a first half-cell and a second half-cell, a first bipolar plate in the first half-cell, and a second bipolar plate in the second half-cell. At least one of the first bipolar plate and the second bipolar plate are a composite containing a conductive material and a blocking material. The blocking material defines a plurality of flow channels that are spaced apart from one another and extend laterally through the composite with respect to the ionically conductive separator. The plurality of flow channels are also in fluid communication with one another in the composite. Such electrochemical cells can be incorporated in electrochemical stacks and/or be fluidly connected to a fluid inlet manifold and a fluid outlet manifold.

27 Claims, 17 Drawing Sheets

(51) Int. Cl.
*H01M 4/88* (2006.01)
*H01M 4/86* (2006.01)
*H01M 8/2455* (2016.01)
*H01M 8/18* (2006.01)
*H01M 8/04276* (2016.01)
*H01M 8/2483* (2016.01)
*H01M 8/0226* (2016.01)

(52) U.S. Cl.
CPC ....... *H01M 8/2455* (2013.01); *H01M 8/2483* (2016.02); *H01M 8/0226* (2013.01); *Y02E 60/528* (2013.01)

(56) References Cited

U.S. PATENT DOCUMENTS

| | | |
|---|---|---|
| 4,532,193 A | 7/1985 | Kniazzeh et al. |
| 4,735,872 A | 4/1988 | Maimoni |
| 4,902,589 A | 2/1990 | Dahn et al. |
| 4,948,681 A | 8/1990 | Zagrodnik et al. |
| 5,188,911 A | 2/1993 | Downing et al. |
| 5,618,641 A | 4/1997 | Arias |
| 5,637,416 A | 6/1997 | Yoshii et al. |
| 5,665,212 A | 9/1997 | Zhong et al. |
| 6,296,746 B1 | 10/2001 | Broman et al. |
| 7,229,564 B2 | 6/2007 | Liu et al. |
| 8,268,475 B2 | 9/2012 | Tucholski |
| 8,268,511 B2 | 9/2012 | Mekala et al. |
| 9,443,782 B1 | 9/2016 | Steimle et al. |
| 2003/0087141 A1 | 5/2003 | Sun et al. |
| 2003/0087156 A1 | 5/2003 | Broman et al. |
| 2003/0099884 A1 | 5/2003 | Chiang et al. |
| 2004/0131916 A1 | 7/2004 | Hodge et al. |
| 2004/0191623 A1 | 9/2004 | Kubata et al. |
| 2004/0224190 A1 | 11/2004 | Sasahara et al. |
| 2004/0233616 A1 | 11/2004 | Arai et al. |
| 2005/0098435 A1 | 5/2005 | Jacobson et al. |
| 2005/0158615 A1 | 7/2005 | Samuel et al. |
| 2005/0260473 A1 | 11/2005 | Wang |
| 2006/0068265 A1 | 3/2006 | Hanlon et al. |
| 2007/0037037 A1 | 2/2007 | Nguyen et al. |
| 2007/0054175 A1 | 3/2007 | Maendle et al. |
| 2007/0125493 A1 | 6/2007 | Jang et al. |
| 2007/0227654 A1 | 10/2007 | Liu et al. |
| 2007/0287047 A1 | 12/2007 | Kaiser et al. |
| 2008/0038622 A1 | 2/2008 | Valensa et al. |
| 2008/0142152 A1 | 6/2008 | Debe et al. |
| 2008/0152839 A1 | 6/2008 | Han et al. |
| 2008/0291027 A1 | 11/2008 | Lake |
| 2008/0305385 A1 | 12/2008 | Smiljanich et al. |
| 2008/0318110 A1 | 12/2008 | Budinski et al. |
| 2010/0003545 A1 | 1/2010 | Horne et al. |
| 2010/0047650 A1 | 2/2010 | Iino et al. |
| 2010/0291442 A1 | 11/2010 | Wang et al. |
| 2011/0223450 A1 | 9/2011 | Horne et al. |
| 2011/0244277 A1 | 10/2011 | Gordon, II et al. |
| 2012/0040254 A1 | 2/2012 | Amendola et al. |
| 2012/0258345 A1 | 10/2012 | Zaffou et al. |
| 2013/0037760 A1 | 2/2013 | Maeda et al. |
| 2013/0071714 A1* | 3/2013 | Perry .................... H01M 8/188 429/101 |
| 2013/0095361 A1 | 4/2013 | Sinsabaugh et al. |
| 2013/0157097 A1 | 6/2013 | Kampanatsanyakorn et al. |
| 2013/0266829 A1 | 10/2013 | Cole et al. |
| 2014/0051007 A1 | 2/2014 | Blanchet et al. |
| 2014/0234734 A1 | 8/2014 | Tsutsumi et al. |
| 2014/0308594 A1 | 10/2014 | Dudney et al. |
| 2014/0349147 A1 | 11/2014 | Shaffer, II et al. |
| 2014/0370404 A1 | 12/2014 | Kato et al. |
| 2015/0079493 A1 | 3/2015 | Guthrie |
| 2015/0099199 A1 | 4/2015 | Bazant et al. |
| 2015/0136301 A1 | 5/2015 | Cyman, Jr. et al. |
| 2016/0020477 A1 | 1/2016 | Smeltz et al. |
| 2016/0036060 A1 | 2/2016 | Brezovec |
| 2016/0240868 A1 | 8/2016 | Warrington et al. |
| 2016/0308224 A1 | 10/2016 | Morris-Cohen et al. |
| 2017/0054164 A1 | 2/2017 | Goeltz et al. |

FOREIGN PATENT DOCUMENTS

| | | |
|---|---|---|
| JP | H-06-290795 | 10/1994 |
| JP | 2001-283879 A | 10/2001 |
| JP | 2005-228633 A | 8/2005 |
| JP | 2008-047313 A | 2/2008 |
| JP | 2008-078104 A | 4/2008 |
| JP | 2008-091110 A | 4/2008 |
| JP | 2008-166260 A | 7/2008 |
| JP | 2011-228059 A | 11/2011 |
| JP | 2012-252955 A | 12/2012 |
| JP | 2014-520382 A | 8/2014 |
| WO | WO-00/16418 A1 | 3/2000 |
| WO | WO-2010/033118 A1 | 3/2010 |
| WO | WO-2012/177255 A1 | 12/2012 |

OTHER PUBLICATIONS

R.P. Hollandsworth, et al., "Zinc/Ferricyanide Battery Development Phase IV," U.S, Department of Energy Report for Contract DE-AC04-76DP00789, May 1985, 278 pages.

Ma et al., "High-performance supercapacitor electrodes based on porous flexible carbon nanofiber paper treated by surface chemical etching," Chemical Engineering Journal, Aug. 2014.

McCreery, "Advanced Carbon Electrode Materials for Molecular Electrochemistry," Chem Rev, 2008, pp. 2646-2687, vol. 108.

Soloveichik, "Flow Batteries: Current Status and Trends," 2015, Chem. Rev., 115 (20), pp. 11533-11558.

International Search Report and Written Opinion dated Jan. 26, 2017, which issued in International Application No. PCT/US16/57963.

International Search Report and Written Opinion dated Jan. 19, 2017, which issued in International Application No. PCT/US16/56672.

Extended European Search Report from European Patent Application No. 14845729.4, dated May 8, 2017.

International Search Report and Written Opinion from PCT/US2017/030452, dated Jul. 3, 2017.

Japanese Office Action from 2016-544047, dated Jul. 3, 2018, 11 pages.

\* cited by examiner

ELECTROCHEMICAL CELLS HAVING DESIGNED FLOW FIELDS AND METHODS FOR PRODUCING THE SAME

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to electrochemical cells and, more specifically, to electrochemical cells having a designed flow field architecture and methods for fabricating such electrochemical cells.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing sides of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof will synonymously refer to materials that undergo a change in oxidation state during operation of a flow battery or like electrochemical energy storage system (i.e., during charging or discharging). A full electrochemical cell contains two half-cells (i.e., a positive half-cell and a negative half-cell) that are separated by the separator material.

In order to increase the amount of energy that can be stored and released by a flow battery, a plurality of individual electrochemical cells can be placed in electrical communication with one another. Placing the individual electrochemical cells in electrical communication with one another typically involves positioning the individual electrochemical cells in a "cell stack" or "electrochemical stack" with a bipolar plate or similar material establishing electrical communication between adjacent electrochemical cells. Bipolar plates are electrically conductive but are substantially non-conductive toward fluid transport. Therefore, bipolar plates allow electrical communication to be established between adjacent electrochemical cells without exchanging electrolyte solutions therebetween.

Within an electrochemical cell, a bipolar plate can either serve directly as an electrode itself when placed in proximity to a separator or membrane, or the bipolar plate can abut a separate electrode material adjacent to the separator or membrane. Regardless of which configuration is present in a given electrochemical cell, it can be desirable to distribute an electrolyte solution efficiently to the separator to promote desired electrochemical reactions in close proximity to the separator. For example, inefficient distribution of an electrolyte solution can decrease operating efficiency and/or increase the occurrence of parasitic reactions at locations removed from the separator. As used herein, the term "parasitic reaction" will refer to any electrochemical side reaction differing from the desired oxidation-reduction cycle of the active material in an electrolyte solution.

Distribution of an electrolyte solution to the separator in an electrochemical cell can be accomplished using a bipolar plate. In some cases, designed flow fields can be incorporated in the bipolar plate to control the flow dynamics in a desired manner, as discussed in more detail hereinafter. Flow field architectures incorporating an open flow field, in which the flow dynamics of an electrolyte solution are largely non-regulated, are also possible. An unmodified porous carbon cloth or felt represents an illustrative material that can provide an open flow field in an electrochemical cell.

Designed flow fields that provide for directional change in at least one coordinate axis can often provide for more efficient cell operation than can open flow fields. Interdigitated flow fields, for example, can provide high current density values while maintaining the cell voltage at a desirable low level. Open flow fields require little, if any, special concerns during manufacturing of electrochemical cells. Designed flow fields, in contrast, can involve moulding and/or machining a plurality of flow channels in a conductive material. Definition of designed flow fields in this manner can add significantly to fabrication costs and represent a rate-limiting manufacturing step. Fabrication of interdigitated flow fields within a bipolar plate can be especially difficult to realize in a timely and cost-effective manner, particularly within a continuous production line.

In view of the foregoing, electrochemical cell configurations that can have designed flow fields readily incorporated therein and facile manufacturing thereof would be highly desirable in the art. The present disclosure satisfies the foregoing needs and provides related advantages as well.

SUMMARY

In some embodiments, the present disclosure provides electrochemical cells containing an ionically conductive separator disposed between a first half-cell and a second half-cell, a first bipolar plate in the first half-cell, and a second bipolar plate in the second half-cell. At least one of the first bipolar plate and the second bipolar plate are a composite including a conductive material and a blocking material. The blocking material defines a plurality of flow channels that are spaced apart from one another and extend laterally through the composite with respect to the ionically conductive separator. The plurality of flow channels are in fluid communication with one another in the composite. Electrochemical stacks can contain a plurality of the electrochemical cells abutted together with one another.

In other various embodiments, methods for forming electrochemical cells can include impregnating a blocking material into a portion of a conductive material to form a composite, and fabricating an electrochemical cell containing a first bipolar plate in a first half-cell and a second bipolar plate in a second half-cell. The first half-cell and the second half-cell are separated by an ionically conductive separator. At least one of the first bipolar plate and the second bipolar plate contains the composite. The blocking material defines a plurality of flow channels that are spaced apart from one another and extend laterally through the composite with respect to the ionically conductive separator. The plurality of flow channels are in fluid communication with one another in the composite.

In still other various embodiments, methods for forming electrochemical cells can include disposing a blocking material in a layer upon a conductive material to form a composite, removing a portion of the blocking material from the layer to define a plurality of flow channels that are spaced apart from one another, and fabricating an electrochemical cell containing a first bipolar plate in a first half-cell and a second bipolar plate in a second half-cell. The first half-cell and the second half-cell are separated by an ionically conductive separator. At least one of the first bipolar plate and the second bipolar plate contains the composite. The plurality of flow channels extend laterally through the composite with respect to the ionically conductive separator. The plurality of flow channels are in fluid communication with one another in the composite.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
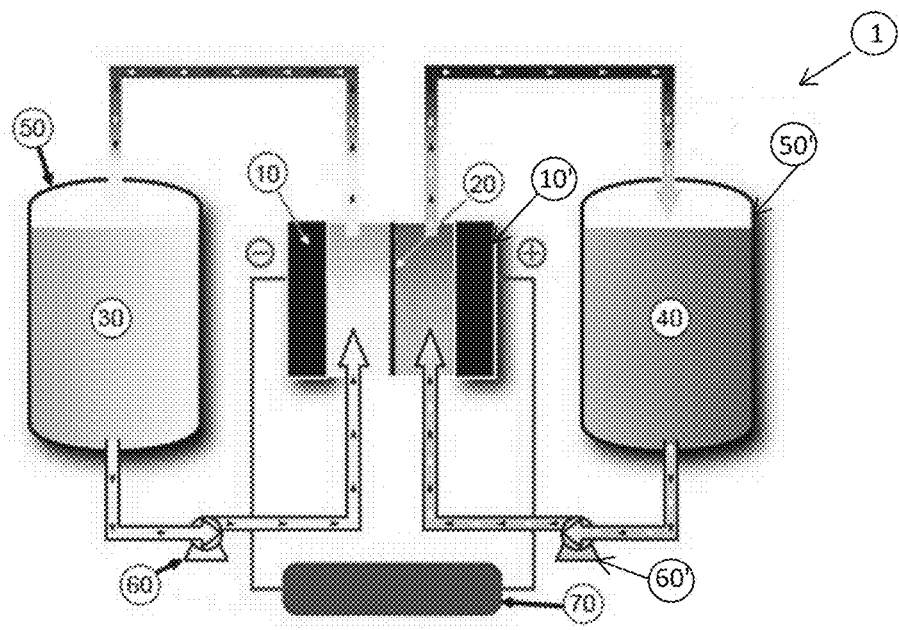
FIG. 1 shows a schematic of an illustrative flow battery containing a single electrochemical cell.

The present disclosure is directed, in part, to electrochemical cells having designed flow fields within a bipolar plate. The present disclosure is also directed, in part, to manufacturing processes for fabricating electrochemical cells having designed flow fields within a bipolar plate. The present disclosure is also directed, in part, to production line systems for manufacturing electrochemical cells having designed flow fields within a bipolar plate.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but no flow battery technologies that are truly commercially viable have yet been developed. One desirable feature of electrochemical cells, including those utilized in flow batteries, is a structure for efficient distribution of an electrolyte solution. Without proper distribution of the electrolyte solution taking place, inefficient cell operation can occur and/or the incidence of parasitic reactions can increase.

Although designed flow fields can be introduced into an electrochemical cell via a bipolar plate housed therein, current techniques for doing so are generally laborious, costly and time-consuming. More specifically, current techniques for introducing designed flow fields in a bipolar plate involve moulding or machining a plurality of flow channels in a conductive material. Moulding and machining operations are inherently slow and can preclude incorporation of such processes within a continuous production line. Interdigitated flow field architectures represent one type of designed flow field that can be desirable to introduce into electrochemical cells. However, it is currently difficult to do so using presently available techniques, particularly in a high-throughput manner.

The present inventors discovered electrochemical cell configurations in which a bipolar plate therein can be readily modified to define a plurality of quasi-interdigitated flow channels therein. Whereas conventional interdigitated flow channels are produced by machining or moulding a conductive material, the inventors discovered that quasi-interdigitated flow channels can be fabricated by selectively placing a blocking material in or on the conductive material. As used herein, the term "blocking material" will refer to any substance that is capable of filling a portion of the pore space in a conductive material and establishing an impermeable region where an electrolyte solution is unable to travel. By placing the blocking material in specified locations within and/or upon the conductive material, the remaining conductive material can provide flow distribution properties that are similar to those provided by an interdigitated flow field. Further disclosure in this regard follows below.

Utilization of a blocking material in the manner described herein can produce both partially closed flow channels and open flow channels. In partially closed flow channel configurations, the conductive material fills the interior of the flow channel, and the blocking material defines the outer bounds of the flow channel. Interconnected pores of the conductive material can allow fluid flow to still take place through the flow channels. That is, the conductive material provides less of an impediment to fluid flow than does the blocking material. In open flow channel configurations, the blocking material again defines the outer bounds of the flow channel, but the interior of the flow channel is not filled with the conductive material of the bipolar plate in this case. In some instances, the interior of the flow channels can be filled with an electrode material. Each configuration is discussed further hereinbelow.

Advantageously, suitable blocking materials can be incorporated on or into conductive materials in a variety of ways which allow flow channels to be readily defined. More specifically, flow channels can be defined in a conductive material by additive or subtractive processes. Additive processes introduce the blocking material selectively in such a way that the flow channels become directly defined during the addition process. Subtractive processes, in contrast, introduce the blocking material uniformly (i.e., non-selectively), and selective removal of a portion of the blocking material can then take place to define the flow channels in or on the conductive material. Both additive and subtractive processes for defining flow channels in a conductive material can be compatible with various high-throughput manufacturing techniques. For example, the electrochemical cell configurations of the present disclosure can be manufactured entirely or substantially with materials supplied to a production line from rolled sources. Further disclosure in this regard follows hereinbelow.

Before further discussing electrochemical cell configurations and processes in which quasi-interdigitated flow fields can be introduced into a bipolar plate, a brief overview of flow batteries and their various components will be provided first. FIG. 1 shows a schematic of an illustrative flow battery containing a single electrochemical cell. Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical stack. This design feature decouples the electrical energy storage system power from the energy storage capacity, thereby allowing for considerable design flexibility and cost optimization.

As shown in FIG. 1, flow battery system 1 includes an electrochemical cell that features separator 20 (e.g., a membrane) that separates the two electrodes 10 and 10' of the electrochemical cell. Electrodes 10 and 10' are formed from a suitably conductive material, such as a metal, carbon, graphite, and the like. Tank 50 contains first active material 30, which is capable of being cycled between an oxidized state and a reduced state.

Pump 60 affects transport of first active material 30 from tank 50 to the electrochemical cell. The flow battery also suitably includes second tank 50' that contains second active material 40. Second active material 40 can be the same material as active material 30, or it can be different. Second pump 60' can affect transport of second active material 40 to the electrochemical cell. Pumps can also be used to affect transport of the active materials from the electrochemical cell back to tanks 50 and 50' (not shown in FIG. 1). Other methods of affecting fluid transport, such as siphons, for example, can also suitably transport first and second active materials 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting configuration of a flow battery. Accordingly, flow batteries and electrochemical cells consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

As used herein, the terms "separator" and "membrane" will refer to an ionically conductive and electrically insulating material disposed between the positive and negative electrodes of an electrochemical cell (i.e., between the negative half-cell and the positive half-cell). The separator can be a membrane in some embodiments and/or an ionomer membrane in other various embodiments. In some embodiments, the separator can be formed from an ionically conductive polymer.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized repeating units can range from about 1 mole percent to about 90 mole percent. Ionized repeating units in an ionomer can include anionic functional groups such as sulfonate, carboxylate, and the like. These functional groups can be charge balanced by mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—$CF=CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, polyvinyl chloride), vinyl polymers, and substituted vinyl polymers. These can be used alone or in combination with any previously described polymer.

Porous separators are non-conductive membranes which allow charge transfer between two electrodes via open channels filled with electrolyte. The pore size distribution of a porous separator can be sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at team one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include, for example, nylon, cotton, polyesters, crystalline silica, crystalline titania, amorphous silica, amorphous titania, rubber, asbestos, wood or any combination thereof. Other suitable reinforcement materials can be envisioned by one having ordinary skill in the art.

Separators within can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which a flow battery is capable of operating with a current efficiency of greater than about 85% with a current density of 100 $mA/cm^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which a flow battery is capable of operating at a voltage efficiency of greater than 60% with a current density of 100 mA/cm², In further embodiments, suitable separators can include those in which a flow battery is capable of operating at a voltage efficiency of greater than 70%, greater than 80% or even greater than 90%.

Flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox-active materials under the operating conditions of a flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons.

Electrode materials can include carbon and various metals, for example. Non-conductive plastic materials can also constitute a portion of an electrode material. In some embodiments, electrodes can have a catalyst deposited thereon. Other types of layers can also be present on the electrode materials. Functions of the optional layers can include, for example, aiding cell assembly, improving contact resistance, and/or providing protection for the separator.

Although not shown in FIG. 1, electrochemical cells can also include a bipolar plate disposed in each half-cell. Bipolar plates can allow a plurality of electrochemical cells to be connected with one another in series, where the bipolar plates are used to establish electrical communication between adjacent electrochemical cells that are abutted together with one another. Accordingly, bipolar plates can be formed from any suitable electrically conductive material that is also substantially non-permeable toward an electrolyte solution in order to prevent an electrolyte solution from leaving its intended half-cell. In some embodiments, suitable conductive materials for forming a bipolar plate can include, for example, non-woven carbon papers, woven carbon cloths, carbon felts, and carbon foams. The foregoing materials can be particularly suitable due to their ability to form quasi-interdigitated flow channels according to the disclosure herein. As indicated above, these features can help distribute an electrolyte solution evenly over the surface of the separator and/or the electrodes of an electrochemical cell. In other instances, flexible graphite foils, expanded graphite foils, or metal films, foils, or sheets can be used to form a bipolar plate.

Figure 2:
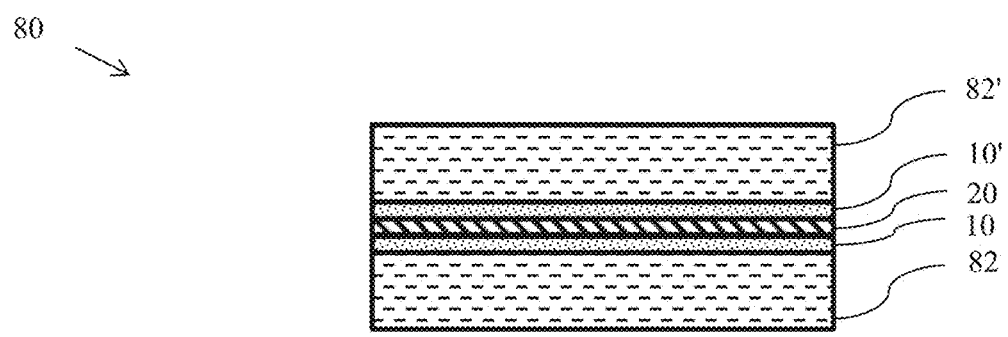
FIG. 2 shows a generalized schematic of an illustrative electrochemical cell containing a bipolar plate.

FIG. 2 shows a generalized schematic of an illustrative electrochemical cell containing a bipolar plate. As shown in FIG. 2, electrochemical cell 80 contains electrodes 10 and 10' disposed on opposing sides of separator 20. Bipolar plates 82 and 82' contact electrodes 10 and 10', respectively, in each half-cell. In alternative configurations (not shown in FIG. 2), electrodes 10 and 10' can be optional, and bipolar plates 82 and 82' can directly contact separator 20, in which case bipolar plates 82 and 82' also function as electrodes, in addition to promoting electrical communication between adjacent electrochemical cells in an electrochemical stack.

Figure 3:
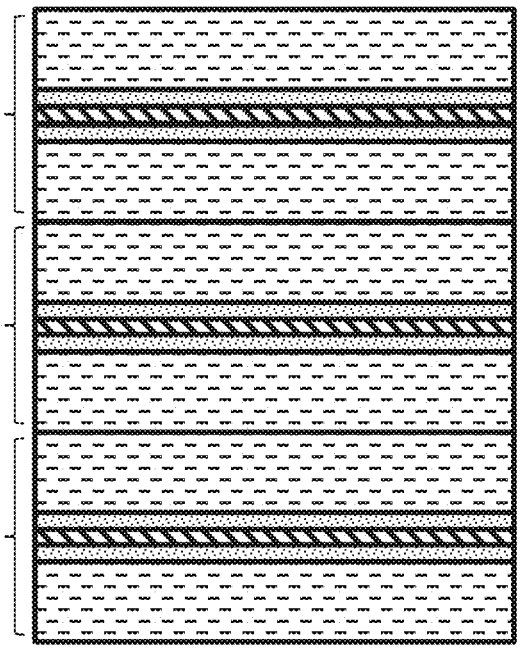
FIG. 3 shows a generalized schematic of an illustrative electrochemical stack containing the electrochemical cell of FIG. 2.
Figure 4:
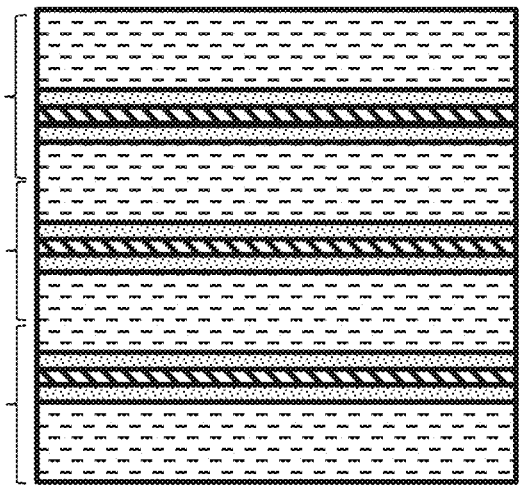
FIG. 4 shows a generalized schematic of an illustrative electrochemical stack having shared bipolar plates between adjacent electrochemical cells.

FIG. 3 shows a generalized schematic of an illustrative electrochemical stack containing the electrochemical cell of FIG. 2. As shown in FIG. 2, electrochemical cells 80a, 80b and 80c are abutted against one another in electrochemical stack 84, such that electrical communication is established through their abutted bipolar plates. In alternative configurations, electrochemical stacks can also be formed such that they share bipolar plates between adjacent electrochemical cells. FIG. 4 shows a generalized schematic of an illustrative electrochemical stack 90 having shared bipolar plates between adjacent electrochemical cells 92a, 92b and 92c. Although the unit cell structure differs somewhat in FIG. 4, one having ordinary skill in the art can envision how such an electrochemical stack could be fabricated by sequentially placing the various components of the cells upon each other. In some instances, an impermeable and electrically conductive barrier can be placed between adjacent electrochemical unit cells to preclude unwanted transferal of an electrolyte solution.

Electrochemical cells can also include one or more frame layers in addition to the separator and the bipolar plates and optional electrodes in each half-cell. Generally, frame layers can be coupled with the bipolar plates, electrodes, and separator to provide a fluidic seal in each half-cell and to hold the components of the half-cells together. More specifically, the fluidic seal can allow an electrolyte solution to be circulated through each half-cell, as discussed further herein. Further, the frame layers can hold the bipolar plates and/or the electrodes against the separator in each half-cell, thereby providing structural integrity to the electrochemical cell. Still further, one or more of the frame layers can provide a conduit through which an electrolyte solution can be delivered to and withdrawn from a bipolar plate via fluid inlet and outlet manifolds.

Figure 5:
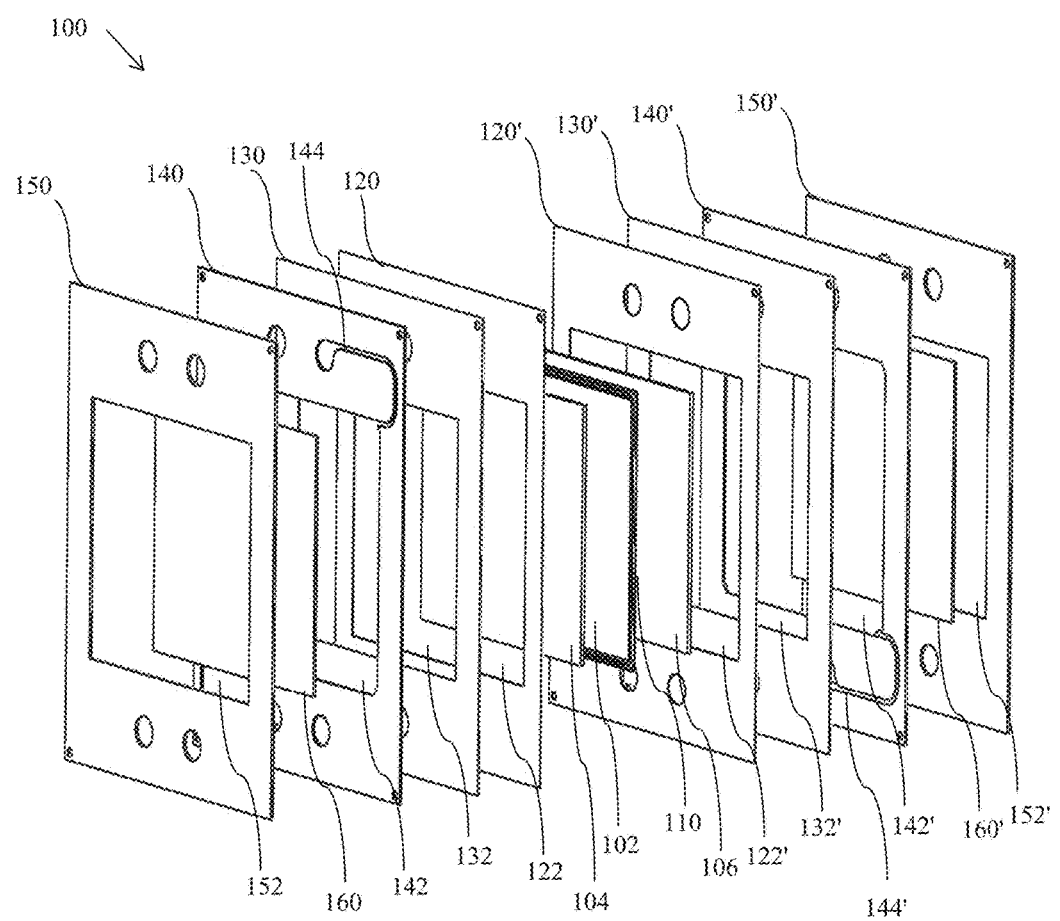
FIG. 5 shows an exploded view of an illustrative electrochemical cell configuration having frame layers and a compressible seal between adjacent half-cells, in which the various cell components are spaced apart from one another to show detail.
Figure 6A:
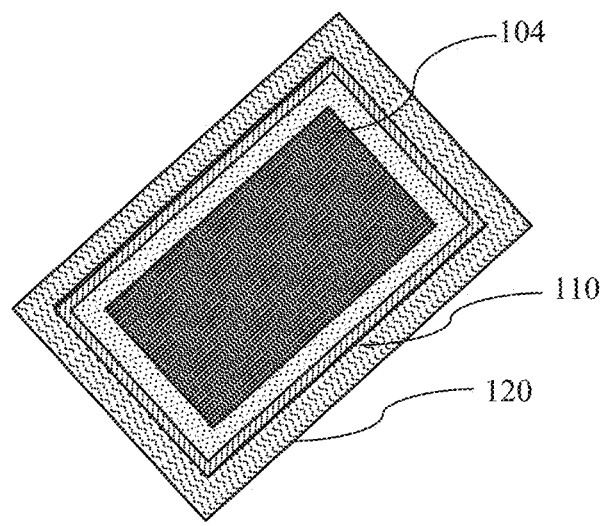
FIG. 6a shows a more detailed view from the cathode side of the electrochemical unit cell of FIG. 5.
Figure 6B:
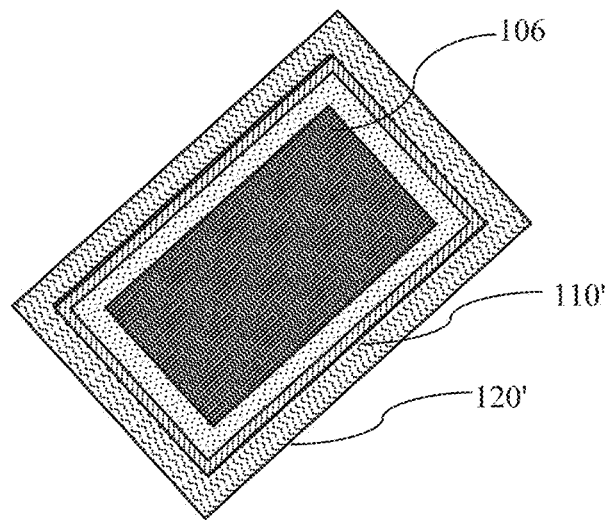
FIG. 6b shows a more detailed view from the anode side of the electrochemical unit cell of FIG. 5.
Figure 7:
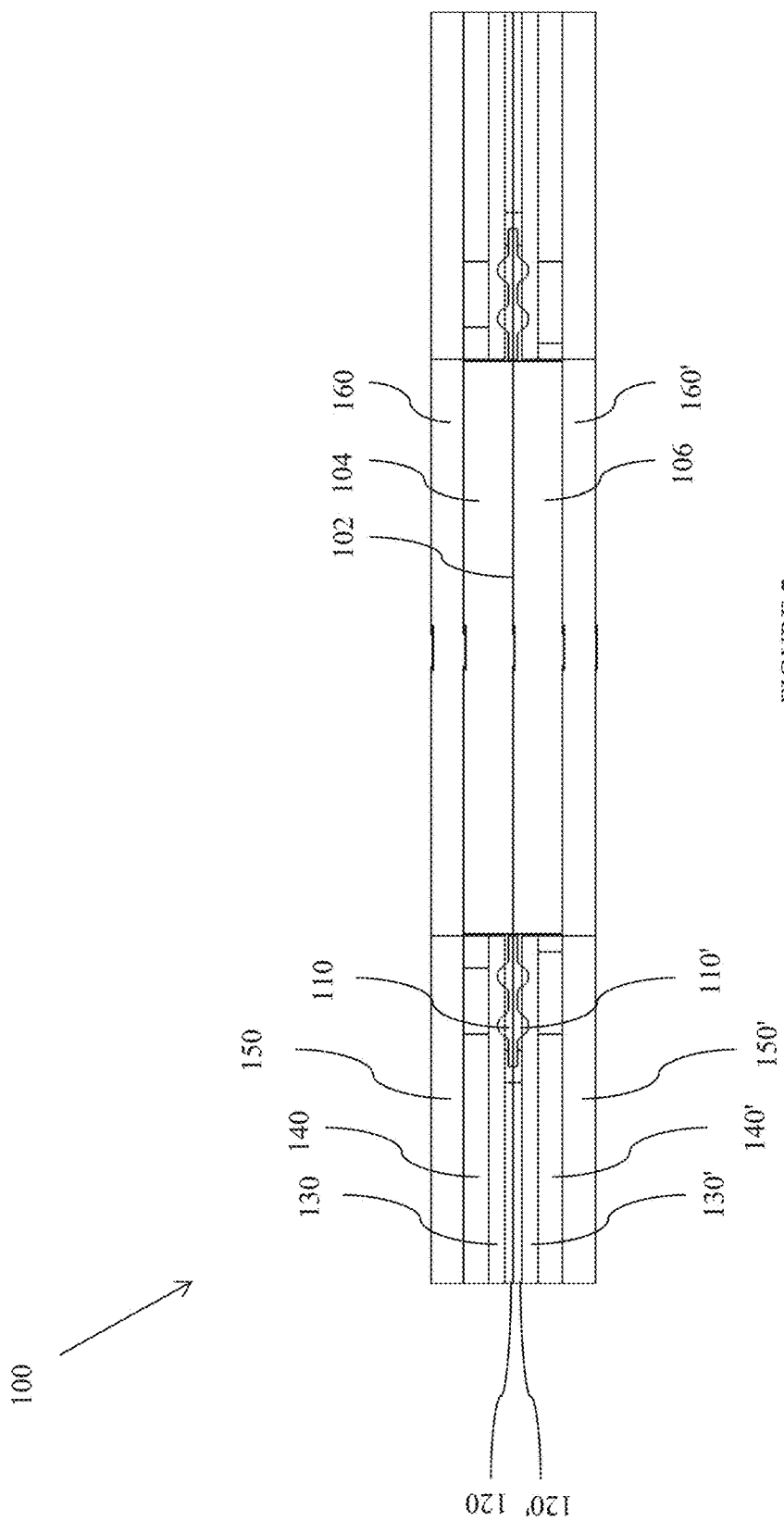
FIG. 7 shows a section view of the electrochemical cell of FIG. 5 with the various cell components fully abutted together with one another.

FIG. 5 shows an exploded view of an illustrative electrochemical cell configuration having frame layers and a compressible seal between adjacent half-cells, in which the various cell components are spaced apart from one another to show detail. In practice, the various cell components are in contact with one another, as shown in FIG. 7, for example. Electrochemical cell 100 includes centrally disposed separator 102. Cathode 104 and anode 106 are abutted upon opposing sides of separator 102. As indicated above, cathode 104 and anode 106 can be optional and an electrically conductive surface can instead be provided by bipolar plates 160 and 160'. Compressible seals 110 and 110' are disposed around the periphery of separator 102 (compressible seal 110' not shown in FIG. 5). FIG. 6A shows a more detailed view from the cathode side of electrochemical cell 102, in which the disposition of compressible seal 110 can be more clearly seen. FIG. 6B shows a corresponding view from the anode side.

Various frame layers can contain separator 102, cathode 104 and anode 106. In addition, the frame layers can provide a sealed chamber through which an electrolyte solution can be circulated through a given half-cell. Frame layers 120 and 120' include respective windows 122 and 122'. Windows 122 and 122' are sized such that frame layers 120 and 120' fit around the outer perimeter of compressible seals 110 and 110', as shown in more detail in FIGS. 6A and 6B. Although FIGS. 6A and 6B have shown frame layers 120 and 120' in direct contact with compressible seals 110 and 110', respectively, it is to be recognized that some open space can exist between the two depending on the size of windows 122 and 122'. The amount of open space can dictate how much compressible seals 110 and 110' can outwardly expand upon undergoing compression.

With continued reference to FIG. 5, frame layers 130 and 130' contact frame layers 120 and 120', respectively, while also contacting compressible seals 110 and 110', respectively. Windows 132 and 132' are defined in frame layers 130 and 130', respectively. Windows 132 and 132' are smaller in size than windows 122 and 122' to allow for frame layers 130 and 130' to contact compressible seals 110 and 110'. In addition to dictating the extent to which compressible seals 110 and 110' can be compressed, frame layers 120 and 120' provide a stable structure against which frame layers 130 and 130' can provide a compressive force. Frame layers 140 and 140' contact frame layers 130 and 130', respectively, and also have windows 142 and 142' respectively defined therein. In addition, frame layers 140 and 140' contain flow distribution channels 144 and 144' defined respectively therein, which extend to the internal space defined by windows 142 and 142'. Flow distribution channels 144 and 144' allow electrolyte solutions to be provided independently (e.g., from a fluid distribution manifold) to the two half-cells of electrochemical unit cell 100. Similar flow distribution channels can also be defined in other frame layers.

Electrolyte solutions can be provided separately to flow distribution channels 144 and 144' from openings disposed within frame layers 150 and 150', thereby providing a location for ingress and egress of the electrolyte solutions to and from the corresponding half-cell. For example, the openings in frame layers 150 and 150' can be connected to a fluid distribution manifold to provide electrolyte solutions separately to the two half-cells. Each of the frame layers has a corresponding opening allowing the electrolyte solution to pass from cell-to-cell in an electrochemical stack. The openings and any associated flow distribution channels provide each electrolyte solution to only one half-cell of the flow battery.

Still referring to FIG. 5, electrochemical cell 100 also includes frame layers 150 and 150', which have windows 152 and 152' respectively defined therein. Bipolar plates 160 and 160' fill windows 152 and 152' of corresponding frame layers 150 and 150' in order to provide fluidic isolation between adjacent electrochemical cells in an electrochemical stack. Adhering bipolar plates 160 and 160' to respective frame layers 150 and 150' precludes electrolyte solution leakage around bipolar plates 160 and 160' in the finished cell. Bipolar plate 160 further extends through windows 122, 132 and 142 and contacts cathode 104. Alternately, bipolar plate 160 can directly contact separator 102. Similarly, bipolar plate 160' further extends through windows 122', 132' and 142' and contacts anode 106 or the opposing side of separator 102. In illustrative embodiments, each frame layer can be formed from an insulator material, particularly thermoplastic materials such as polyethylene or other polyolefin materials.

FIG. 7 shows a section view of the electrochemical cell of FIG. 5 with the various cell components fully abutted together with one another. Frame layers 120, 130, 140, 150, 120', 130', 140' and 150' can collectively define chambers on opposing sides of separator 102 through which electrolyte solutions can be circulated. That is, frame layers 120, 130 and 140 together with separator 102, compressible seal 110, and bipolar plate 160 collectively define a closed chamber through which a first electrolyte solution can be flowed about cathode 104. Similarly, frame layers 120', 130', 140', separator 102, compressible seal 110' and bipolar plate 160' define a closed chamber through which a second electrolyte solution can be flowed about anode 106. The volumes of the respective chambers are determined, for example, by the thickness of the various frame layers and the size of the corresponding windows.

Figure 8:
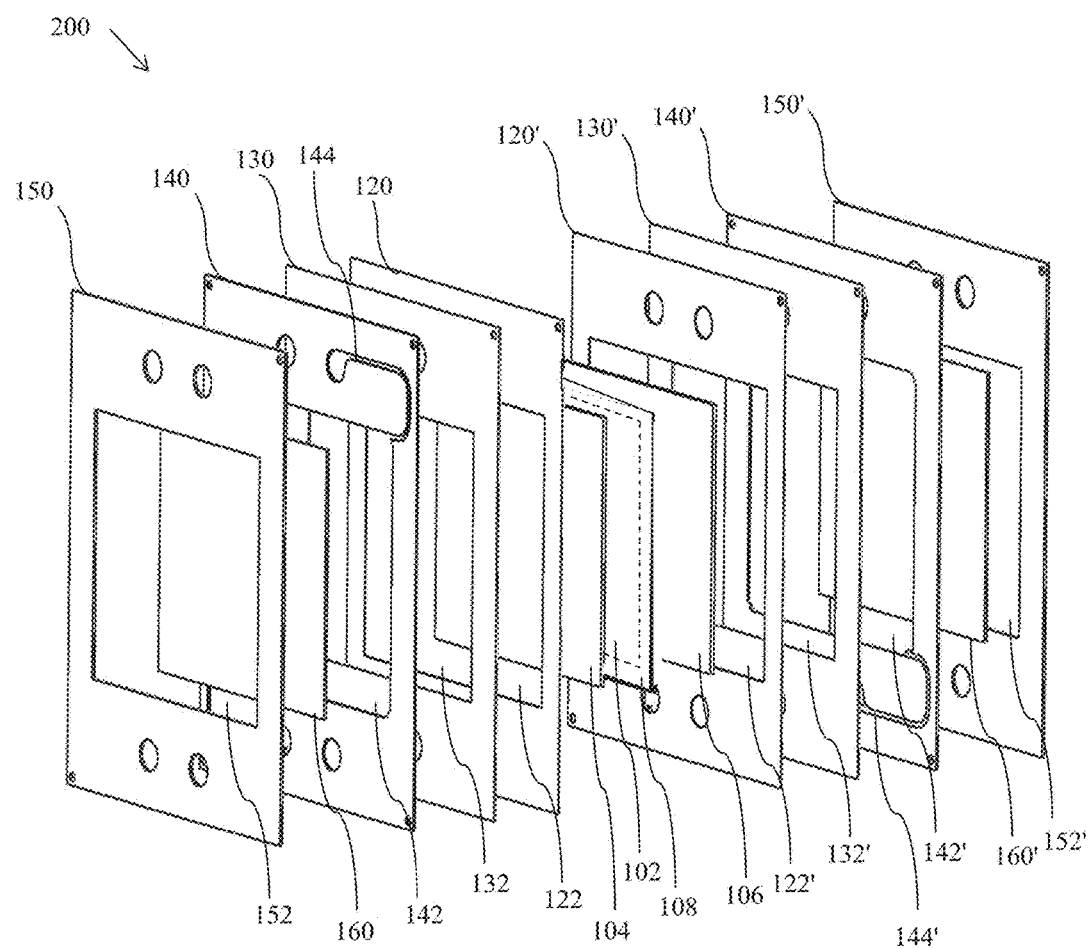
FIG. 8 shows an exploded view of another illustrative electrochemical cell configuration, in which the various cell components are spaced apart from one another to show detail.

FIG. 8 shows an exploded view of another illustrative electrochemical cell configuration, in which the various cell components are spaced apart from one another to show detail. Electrochemical cell 200 in FIG. 8 primarily differs from electrochemical cell 100 of FIGS. 5, 6A, 6B and 7 in that compressible seals 110 and 110' are omitted in electrochemical cell 200. Otherwise, the elements of the electrochemical cell configuration in FIG. 8 are similar to those of the preceding FIGURES, and like reference characters will be used as a result. Common elements in FIG. 8 will similarly not be described again in detail unless their disposition differs in the alternative cell configuration.

Figure 9:
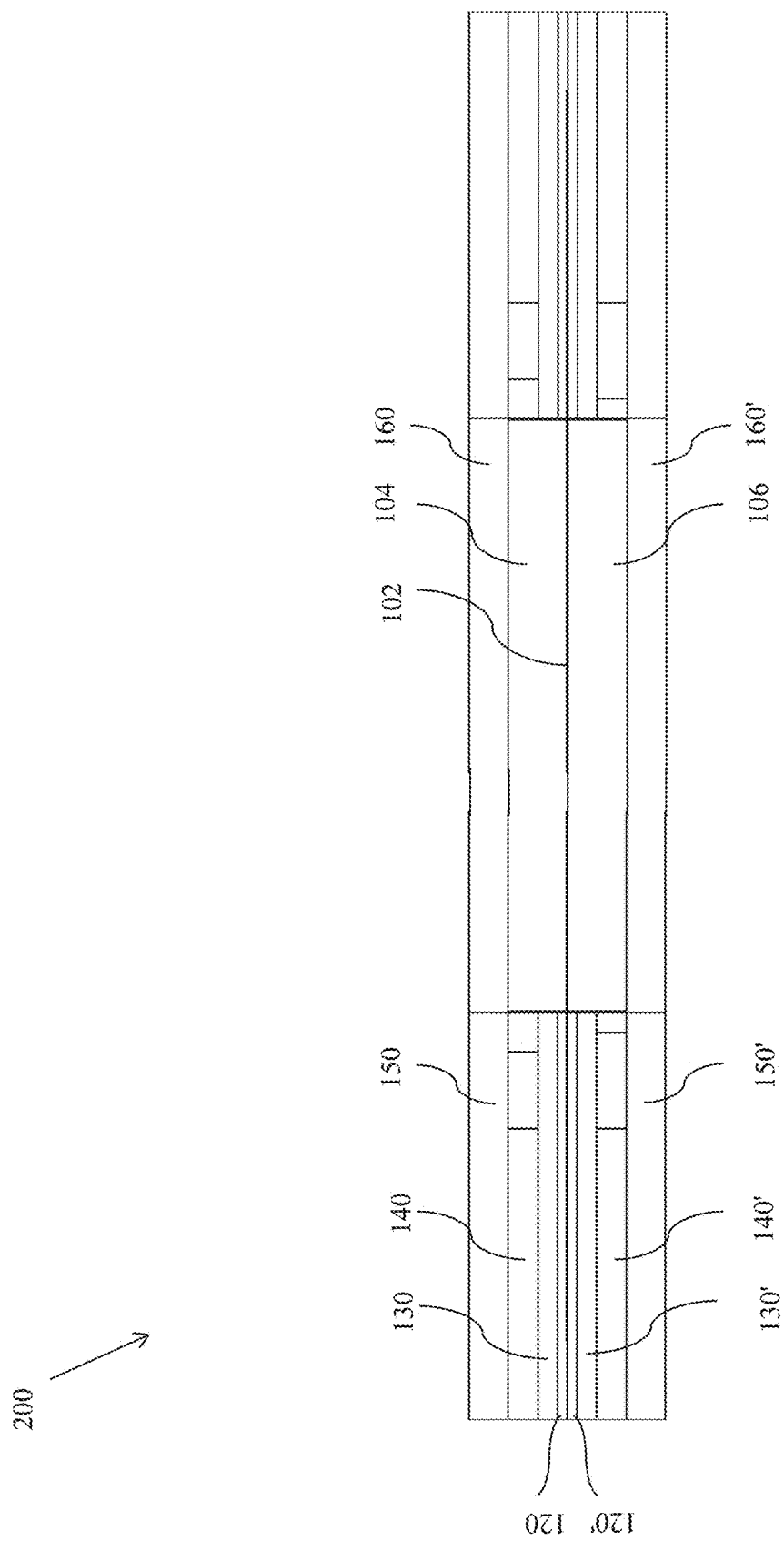
FIG. 9 shows a section view of the electrochemical cell of FIG. 8 with the various cell components fully abutted together with one another.

In the cell configuration of FIG. 8, frame layers 120 and 120' make direct contact with opposing sides of separator 102 and are bonded thereto. Direct bonding of this type can promote sealing in manner similar to that provided by compressible seals 110 and 110' in the cell configuration of FIG. 5. Hence, compressible seals 110 and 110' can be omitted in the electrochemical cell configuration of FIG. 8 while still allowing a fluidic seal to be formed. A resulting distinction between the cell configuration of FIG. 5 and that of FIG. 8 is that in the latter, the two half-cells are connected to one another at separator 102, whereas in the former, the electrochemical cell can be disassembled by relieving the confinement pressure of frame layers 120 and 120' upon compressible seals 110 and 110'. FIG. 9 shows a section view of the electrochemical cell of FIG. 8 with the various cell components fully abutted together with one another.

Various configurations for electrochemical cells and bipolar plates having quasi-interdigitated flow channels will now be described in greater detail. In various embodiments, electrochemical cells of the present disclosure can include an ionically conductive separator disposed between a first half-cell and a second half-cell, a first bipolar plate in the first half-cell, and a second bipolar plate in the second half-cell. At least one of the first bipolar plate and the second bipolar plate are each a composite containing a conductive material and a blocking material. The blocking material defines a plurality of flow channels that are spaced apart from one another and extend laterally through the composite with respect to the ionically conductive separator, such that the plurality of flow channels are in fluid communication with one another in the composite. More specific details are provided hereinbelow and in the accompanying FIGURES.

As indicated above, electrodes can optionally be present in each half-cell, or the first bipolar plate and the second bipolar plate can contact opposing sides of the ionically conductive separator. Accordingly, in some embodiments, electrochemical cells of the present disclosure can further include a first electrode in the first half-cell and a second electrode in the second half-cell, where the first electrode intervenes between the first bipolar plate and the ionically conductive separator, and the second electrode intervenes between the second bipolar plate and the ionically conductive separator. In embodiments wherein first and second electrodes are present, the first bipolar plate can contact the first electrode, and the second bipolar plate can contact the second electrode. In embodiments wherein the first and second electrodes are absent, the first bipolar plate and the second bipolar plate can contact opposing sides of the ionically conductive separator.

As indicated above, suitable blocking materials can include any substance that is substantially impermeable to an electrolyte solution. Suitable blocking materials can include, for example, various polymer materials. In more particular embodiments, suitable blocking materials can include various thermoplastic polymers. Thermoplastic polymers can be particularly suitable due to the relative ease through which they can be selectively impregnated into a conductive material or layered upon a conductive material. Both dispositions of the blocking material can be used to define flow channels upon a bipolar plate, as discussed hereinafter.

In further embodiments, electrochemical cells of the present disclosure can include a fluid inlet manifold configured to provide a first electrolyte solution to the first bipolar plate and a second electrolyte solution to the second bipolar plate, and a fluid outlet manifold configured to withdraw the first electrolyte solution from the first bipolar plate and the second electrolyte solution from the second bipolar plate. More specifically, the fluid inlet manifold and the fluid outlet manifold can be configured to provide and to withdraw the first electrolyte solution and the second electrolyte solution from alternating flow channels within the composite. Otherwise, the structures of the fluid inlet manifold and the fluid outlet manifold are not considered to be particularly limited.

In still more particular embodiments, the fluid inlet manifold and the fluid outlet manifold can be configured to provide and to withdraw the first electrolyte solution and the second electrolyte solution on opposing lateral faces of the first bipolar plate and the second bipolar plate. Introduction and withdrawal of the first and second electrolyte solutions in this manner can allow a flow field similar to that provided by interdigitated flow channels to be established.

Bipolar plates containing quasi-interdigitated flow channels will now be described in further detail with reference to FIGS. 10-17. In order that the flow dynamics in the flow channels can be better understood, FIG. 10 shows the connection of a bipolar plate to a fluid inlet manifold and a fluid outlet manifold in the manner described above.

Figure 10:
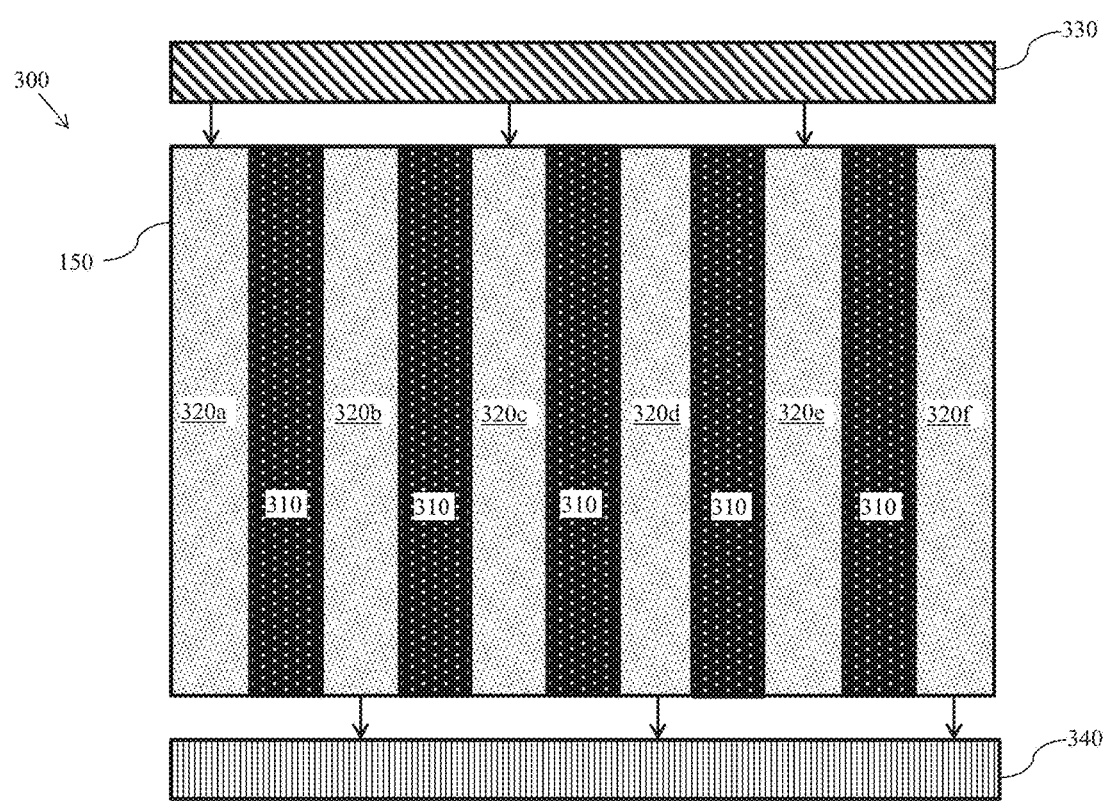
FIG. 10 shows a top view of a schematic of an illustrative electrochemical cell containing a bipolar plate with a plurality of flow channels defined therein.

FIG. 10 shows a top view of a schematic of an illustrative electrochemical cell containing a bipolar plate with a plurality of flow channels defined therein. As shown in FIG. 10, electrochemical cell 300 contains bipolar plate 150, which has blocking material 310 integrated therewith. The disposition of blocking material 310 defines flow channels 320a-f within bipolar plate 150. Further discussion of how blocking material 310 is integrated within bipolar plate 150 is provided in FIGS. 11-16, which are described in further detail below.

Electrochemical cell 300 further contains fluid inlet manifold 330, which is configured to provide an electrolyte solution to a first plurality of flow channels 320a-f, and fluid outlet manifold 340, which is configured to withdraw the electrolyte solution from a second plurality of flow channels 320a-f. Input and withdrawal of the electrolyte solution occurs on opposing lateral faces of bipolar plate 150, as depicted in FIG. 10. More specifically, the first plurality of flow channels 320a-f and the second plurality of flow channels 320a-f are disposed in an alternating fashion. Since flow channels 320a-f are in fluid communication with one another within bipolar plate 150, the electrolyte solution can cross over between adjacent flow channels. Therefore, the electrolyte solution can be introduced through a first flow channel and then withdrawn through a second flow channel that is adjacent to the first flow channel.

In some embodiments, one or more frame layers can be configured such that the electrolyte solution is provided to and withdrawn from alternating flow channels.

Before discussing FIGS. 11-17, it is to be recognized that the number and width of flow channels 320a-f in FIG. 10 is merely illustrative and can be varied to meet the needs of a particular application. Moreover, although FIG. 10 has depicted flow channels 320a-f as being substantially linear and parallel to one another, non-parallel or even random dispositions of flow channels 320a-f are possible in alternative embodiments, provided that fluid communication between adjacent flow channels remains viable. In some embodiments, the flow channels can be non-intersecting.

In more particular embodiments, the number of flow channels defined within the bipolar plate can range between about 5 and about 500, or between about 4 and about 10, or between about 10 and about 100. In some or other embodiments, a width of the flow channels defined within the bipolar plate can range between 100 microns to about 10 mm, or between about 100 microns and about 1 mm, or between about 1 mm and about 10 mm. The flow channels within the bipolar plate can be any combination of filled flow channels or open flow channels consistent with the various embodiments of the present disclosure.

Figure 11:
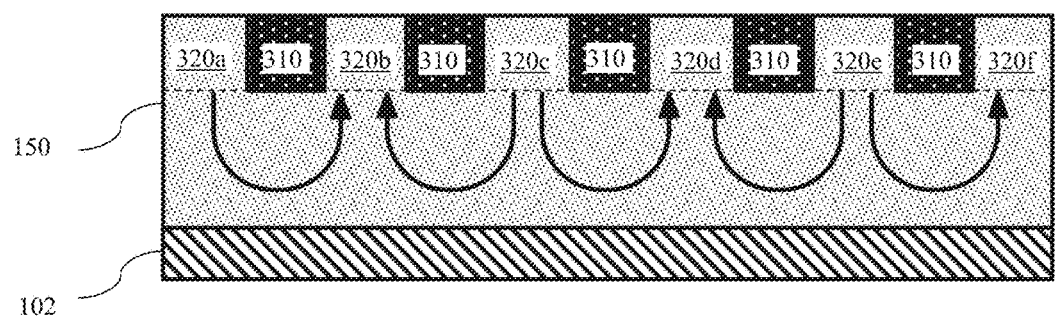
FIG. 11 shows a side view of a schematic of an illustrative electrochemical half-cell containing a bipolar plate with a blocking material impregnated therein.
Figure 12:
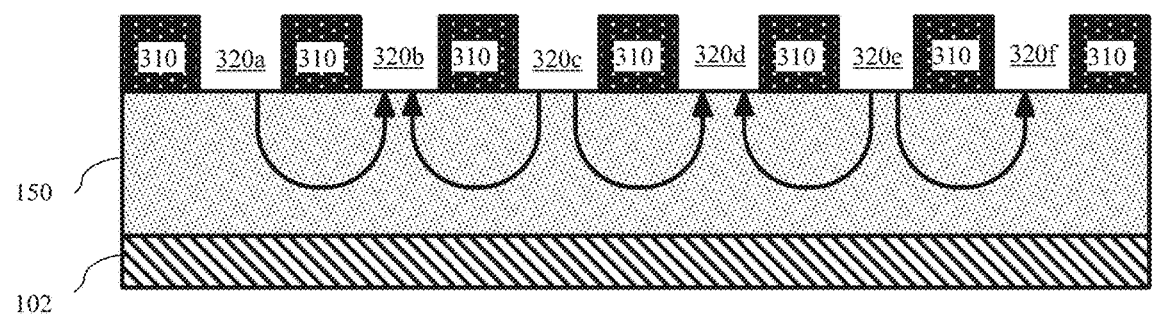
FIG. 12 shows a side view of a schematic of an illustrative electrochemical half-cell containing a bipolar plate with a blocking material disposed as a layer thereon.

As indicated above, various dispositions of the blocking material with respect to the bipolar plate are possible in order to define the plurality of flow channels therein. In some embodiments, the blocking material can be impregnated into the conductive material defining the bipolar plate, as shown in FIG. 11. In other embodiments, the blocking material can constitute a layer upon the conductive material, as shown in FIG. 12. At least partial impregnation of the blocking material can also occur in layered embodiments. Each of these configurations will now be described in further detail hereinafter. Although the blocking material configurations bear some similarities to one another in FIGS. 11 and 12, the methods through which they are produced can vary considerably, as discussed in further detail below.

FIG. 11 shows a side view of a schematic of an illustrative electrochemical half-cell containing a bipolar plate with a blocking material impregnated therein. As shown in FIG. 11, blocking material 310 is wholly impregnated within the interior of bipolar plate 150, thereby defining flow channels 320a-f therein. As depicted in FIG. 11, flow channels 320a-f constitute the portion of bipolar plate 150 that is above the dotted line and are filled with the conductive material. Accordingly, fluid flow along the length of flow channels 320a-f takes place through the existing pore space within the conductive material. Flow channels 320a-f are in fluid communication within one another via the remainder of bipolar plate 150 (i.e., the portion of bipolar plate 150 that is below the dotted line).

The fluid flow dynamics within bipolar plate 150 are also shown in FIG. 11. Since electrolyte solution is introduced into flow channels 320a, 320c and 320e (see FIG. 10), each of which have an inlet (i.e., that provided by fluid inlet manifold 330) but no outlet along their length, the fluid flow dynamics shunt the electrolyte solution into adjacent flow channels 320b, 320d and 320f as the electrolyte solution proceeds away from the fluid inlet. Conversely, flow channels 320b, 320d and 320f have an outlet (i.e., that provided by fluid outlet manifold 340) but no fluid inlet. Since flow channel 320a is adjacent to only flow channel 320b, its electrolyte solution proceeds via convection primarily to this flow channel. Similarly, flow channel 320f substantially receives electrolyte solution from only flow channel 320e. Flow channels 320b-e, which are on the interior of bipolar plate 150, provide or receive electrolyte solution to and from two adjacent flow channels. Again, it to be emphasized that the number, width and other parameters of flow channels 320a-f in FIG. 11 is merely illustrative. Moreover, although FIG. 11 has shown blocking material 310 as being impregnated wholly within bipolar plate 150, it is to be recognized that the impregnation can be partial in some embodiments, in which case a portion of flow channels 320a-f can reside outside the conductive material defining bipolar plate 150. Accordingly, flow channels 320a-f can be partially open in some embodiments. A blocking material disposition similar to this is shown in the alternative configuration of FIG. 12, which is discussed further below. Although FIG. 11 has shown flow channels 320a and 320f as being defined at the edges of bipolar plate 150, it is to be recognized that they can also be defined on the interior by disposing additional blocking material 310 along the edges of bipolar plate 150.

FIG. 12 shows a side view of a schematic of an illustrative electrochemical half-cell containing a bipolar plate with a blocking material disposed as a layer thereon. Although FIG. 12 has shown blocking material 310 within the layer as being non-impregnated within the conductive material of bipolar plate 150, it is to be recognized that similar configurations can be realized by partially or fully impregnating blocking material 150 therein, as discussed in brief above in regard to FIG. 11. As shown in FIG. 12, blocking material 310 is disposed as a partial layer upon bipolar plate 150, thereby defining flow channels 320a-f in between. In contrast to the configuration of FIG. 11, flow channels 320a-f are open in FIG. 12. However, in some embodiments, flow channels 320a-f can be filled with an electrode material in contact with bipolar plate 150. Like the configuration of FIG. 11, flow channels 320a-f are in fluid communication within one another via bipolar plate 150, and the fluid flow dynamics are also similar.

Figure 13:
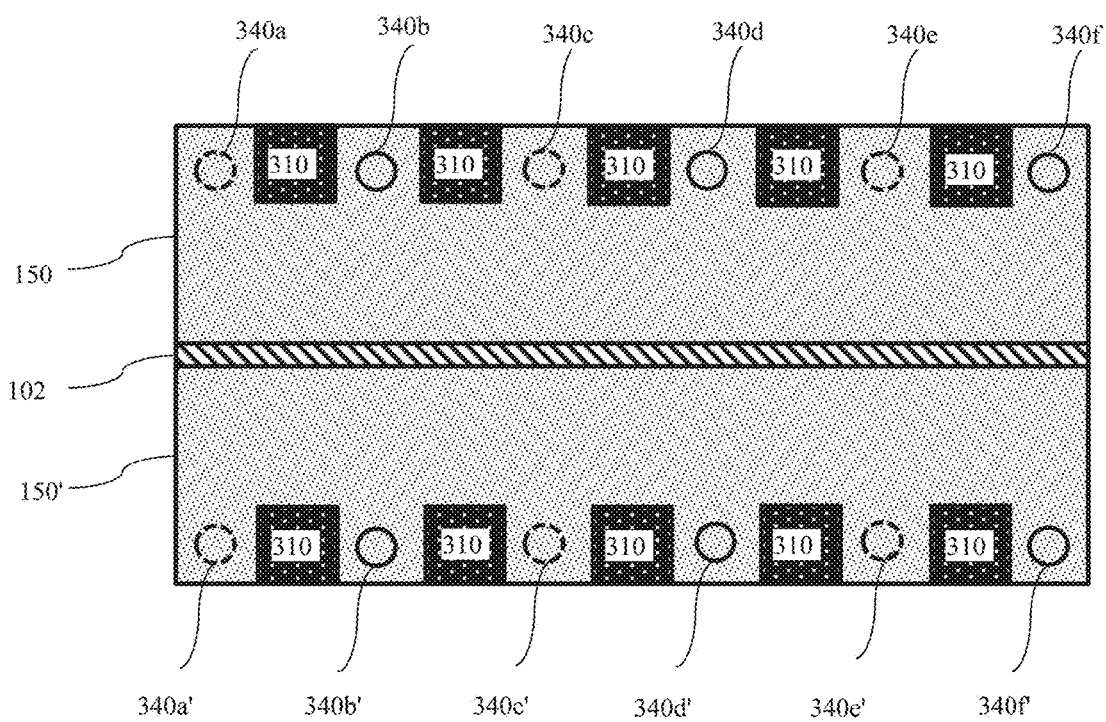
FIG. 13 shows a side view of a schematic of a complete electrochemical cell in which bipolar plates containing a blocking material are present.

FIG. 13 shows a side view of a schematic of a complete electrochemical cell in which bipolar plates containing a blocking material are present. Although FIG. 13 has shown the blocking material configuration of FIG. 11, it is to be recognized that the blocking material configuration of FIG. 12 can be incorporated similarly within the complete electrochemical cell. In the interest of clarity, the complete fluid inlet manifold 320 and fluid outlet manifold 330 have been omitted from FIG. 13. Instead, inlet locations 340a,a', 340c,c' and 340e,e' are shown in phantom in FIG. 13 and outlet locations 340b,b', 340d,d' and 340f,f' are shown with solid lines in the corresponding half-cells. Accordingly, introduction and withdrawal of electrolyte solutions can take place in a manner similar to that described above for FIG. 10. An impermeable and electrically conductive layer can cap bipolar plates 150 and 150' in order to promote retention of each electrolyte solution in its respective half-cell. The impermeable layer and electrically conductive layer can further prevent leakage of electrolyte solutions between adjacent electrochemical cells in an electrochemical stack.

In further embodiments, electrochemical stacks containing a plurality of the electrochemical cells connected in series are disclosed herein. Illustrative configurations are described hereinabove in regard to FIGS. 3 and 4 and will not be described again in detail. In more particular embodiments, the electrochemical stacks can have adjacent electrochemical cells abutted together with one another, such as shown in FIG. 3.

In further embodiments, an additional conductive layer can be disposed between adjacent electrochemical cells in an electrochemical stack. In illustrative embodiments, an additional conductive layer can be placed between adjacent electrochemical cells if the conductive material defining a bipolar plate fails to maintain the electrochemical cell in fluidic isolation from an adjacent cell.

In addition, although the FIGURES have depicted the first and second bipolar plates as being separate entities, it is to be recognized that bipolar plates can be shared between adjacent electrochemical cells in an electrochemical stack. That is, in some embodiments, a bipolar plate of a first electrochemical cell can be shared as a second bipolar plate of a second electrochemical cell. In other embodiments discussed above, bipolar plates from adjacent electrochemical cells can be abutted together with one another.

In some or other embodiments, the electrochemical cells and electrochemical stacks disclosed herein can be incorporated in flow batteries or similar electrochemical systems. Exemplary flow battery configurations are discussed in more detail hereinabove. Other electrochemical systems in which the electrochemical cells and electrochemical stacks of the present disclosure can be applicable include, for example, electrolyzers and fuel cell systems.

Flow batteries incorporating electrochemical cells of the present disclosure are, in some embodiments, suited to sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries can be used as power sources for remote camps, forward operating bases, off-grid telecommunications, remote sensors, the like, and any combination thereof. Further, it is to be appreciated that electrochemical energy storage media other than flow batteries can also incorporate the electrochemical cells disclosed herein, including those utilizing stationary electrolyte solutions.

In additional embodiments, electrochemical cells, electrochemical stacks, and flow batteries of the present disclosure can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the cells and storage tanks for holding charged and discharged electrolytes. An operation management system can also be present. The operation management system can be any suitable controller device, such as a computer or microprocessor, and can contain logic circuitry that sets operation of any of the various valves, pumps, circulation loops, and the like.

Methods for fabricating electrochemical cells containing a bipolar plate with a blocking material incorporated herein will now be described in further detail. Such methods may be referred to herein as being "additive" or "subtractive," depending upon whether the blocking material is only added to a conductive material to define flow channels (additive) or is added to the conductive material and then a portion thereof is subsequently removed (subtractive).

In more specific embodiments, additive methods for defining flow channels within a conductive material and forming an electrochemical cell can include: impregnating a blocking material into a portion of a conductive material to form a composite, and fabricating an electrochemical cell containing a first bipolar plate in a first half-cell and a second bipolar plate in a second half-cell which are separated by an ionically conductive separator. At least one of the first bipolar plate and the second bipolar plate contain the composite. The composite is configured such that the blocking material defines a plurality of flow channels that are spaced apart from one another and extend laterally through the composite with respect to the ionically conductive separator. As discussed above, the plurality of flow channels are in fluid communication with one another in the composite, such as through the portions of the bipolar plates that do not contain the blocking material. In further embodiments, the methods can include abutting a plurality of the electrochemical cells together with one another to form an electrochemical stack, as discussed above.

In some embodiments, impregnating the blocking material can include thermally impregnating a thermoplastic polymer into the conductive material. Illustrative thermoplastic polymers that can be suitable in this regard are discussed above. Thermoplastic polymers can be particularly useful in this respect due to their ability to transition rapidly between a substantially solidified form and fluidized form, in which they can at least partially penetrate into the interior of a conductive material. Illustrative thermal impregnation techniques can include, for example, hot-rolling, laser welding, ultrasonic welding, and the like.

In some embodiments, thermally impregnating a thermoplastic polymer into a conductive material can include applying a plurality of spaced apart strips of the thermoplastic polymer to a surface of the conductive material. The thermoplastic polymer and/or the conductive material can then be heated to infiltrate the thermoplastic polymer at least partially into the interior of the conductive material. As discussed above, the impregnation of the thermoplastic polymer can be full or partial, which can depend upon the amount of time that thermal impregnation is allowed to take place.

Figure 14:
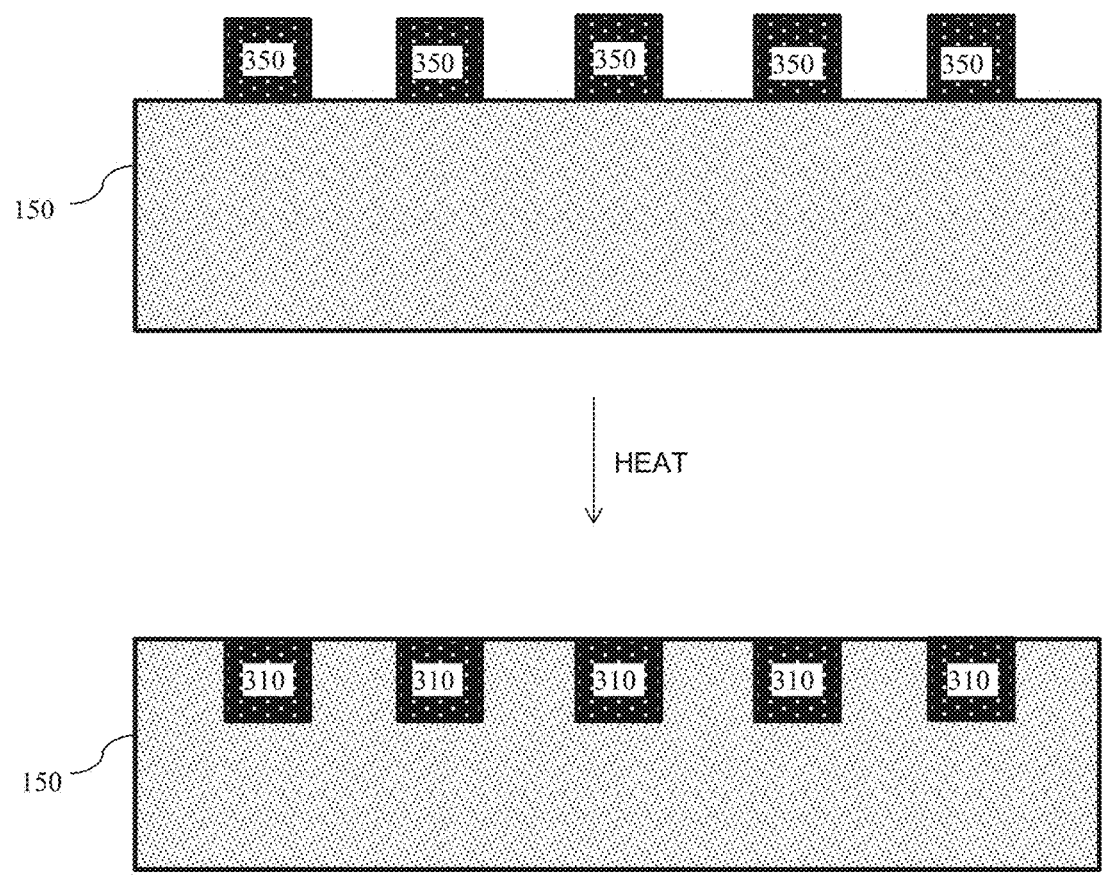
FIGS. 14 and 15 show two different views of an illustrative process through which a thermoplastic polymer can be impregnated into the conductive material of a bipolar plate.
Figure 15:
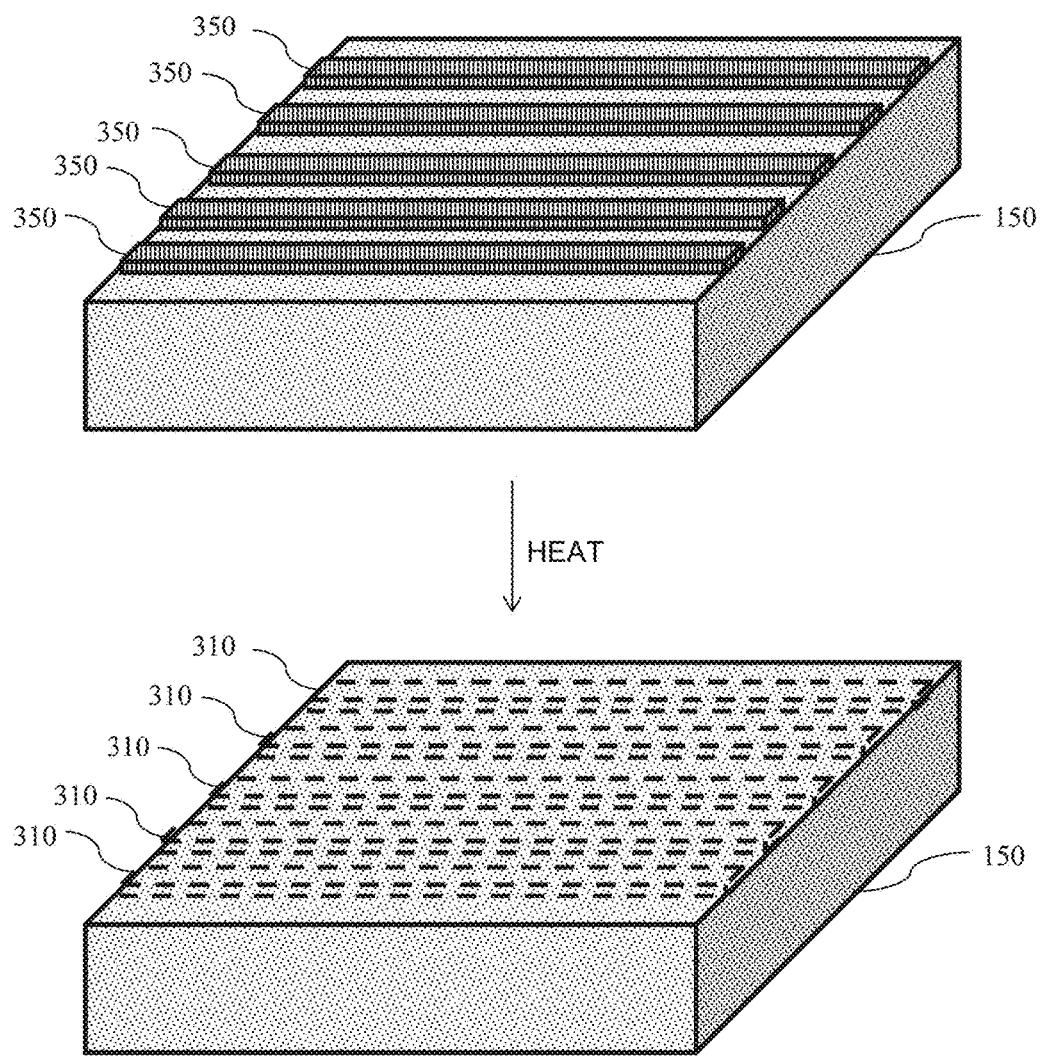
Figure 16:
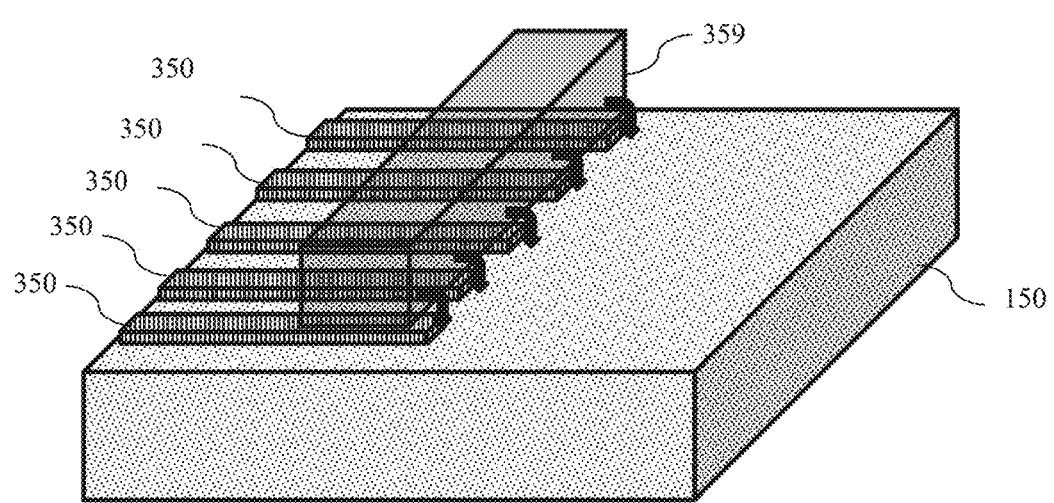
FIG. 16 shows an illustrative liquid deposition process employing a sprayer.

FIGS. 14 and 15 show two different views of an illustrative process through which a thermoplastic polymer can be impregnated into the conductive material of a bipolar plate. As shown in FIGS. 14 and 15, thermoplastic strips 350 are applied to the surface of a conductive material that is to become bipolar plate 150. Thereafter, thermoplastic strips 350 and/or bipolar plate 150 can undergo heating to soften the thermoplastic material and infiltrate it into bipolar plate 150. Suitable heating techniques are not considered to be particularly limited and can include, for example, radiant heating, resistive heating, heated air circulation, autoclave heating, laser heating, hot lamination rollers, and the like. The disposition of thermoplastic strips 350 upon bipolar plate 150 can take place by manual layup or in any automated or semi-automated manner. For example, in some embodiments, thermoplastic strips 350 can be fed from rolled sources in a continuous production line, as discussed hereinafter. In other embodiments, thermoplastic strips 350 can be applied to bipolar plate 150 in a liquid form, such as a melt or solution of thermoplastic polymer applied from a print head, sprayer or like precision deposition instrument. Liquid forms of other blocking materials, such as epoxies, can be applied similarly in alternative embodiments. During a liquid phase deposition, impregnation of the blocking material can occur contemporaneously with deposition, rather than as a discrete infiltration step. FIG. 16 shows an illustrative liquid deposition process employing a sprayer 359, for example.

In other more specific embodiments, subtractive methods for defining flow channels within a conductive material and forming an electrochemical cell can include: disposing a blocking material in a layer upon a conductive material to form a composite, removing a portion of the blocking material from the layer to define a plurality of flow channels that are spaced apart from one another, and fabricating an electrochemical cell containing a first bipolar plate in a first half-cell and a second bipolar plate in a second half-cell which are separated by an ionically conductive separator. At least one of the first bipolar plate and the second bipolar plate contain the composite. The composite is configured such that the plurality of flow channels extend laterally through the composite with respect to the ionically conductive separator. As discussed above, the plurality of flow channels are in fluid communication with one another in the composite, such as through the portions of the bipolar plates that do not contain the blocking material. In further embodiments, the methods can include abutting a plurality of the electrochemical cells together with one another to form an electrochemical stack, as discussed above.

In the subtractive methods of the present disclosure, the blocking material can be deposited as a substantially continuous layer upon a surface of the conductive material, and a portion of the blocking material can then be removed through selective ablation to define the flow channels as a discontinuous layer. Suitable ablation techniques can include, for example, laser ablation, chemical etching, and combinations thereof. In some embodiments, masking techniques can be utilized in conjunction with chemical etching such that a desired portion of the blocking material can be removed to define the flow channels. Laser ablation can be particularly desirable due to the precision with which the flow channels can be defined, ideally without using masking techniques in conjunction with the removal. In some embodiments, ablation of the blocking material can remove a portion of the conductive material without compromising the operability of the resulting bipolar plate.

In more specific embodiments, the blocking material being deposited as a layer upon the conductive material can be a thermoplastic polymer. Suitable thermoplastic polymers can include those discussed in more detail above. In further embodiments, the subtractive methods for forming flow channels can include at least partially impregnating the blocking material into the conductive material via thermal impregnation. Heating techniques for performing the thermal impregnation operation can include those discussed above. In some embodiments, the thermal impregnation can be conducted such that the thermoplastic polymer infiltrates only very slightly into the conductive material and remains as a substantially continuous surface layer prior to ablation.

Figure 17:
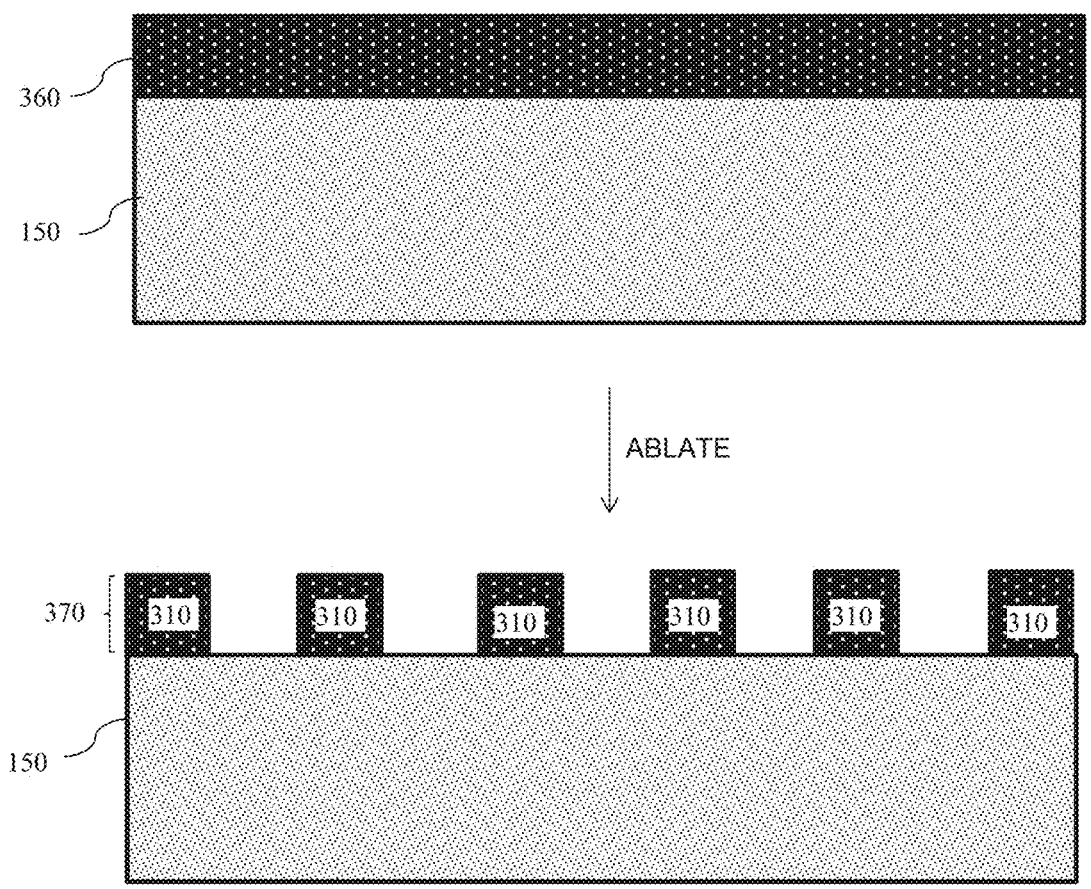
FIGS. 17 and 18 show two different views of an illustrative process through which a thermoplastic polymer can be layered upon the conductive material of a bipolar plate and then undergo ablation to define flow channels.
Figure 18:
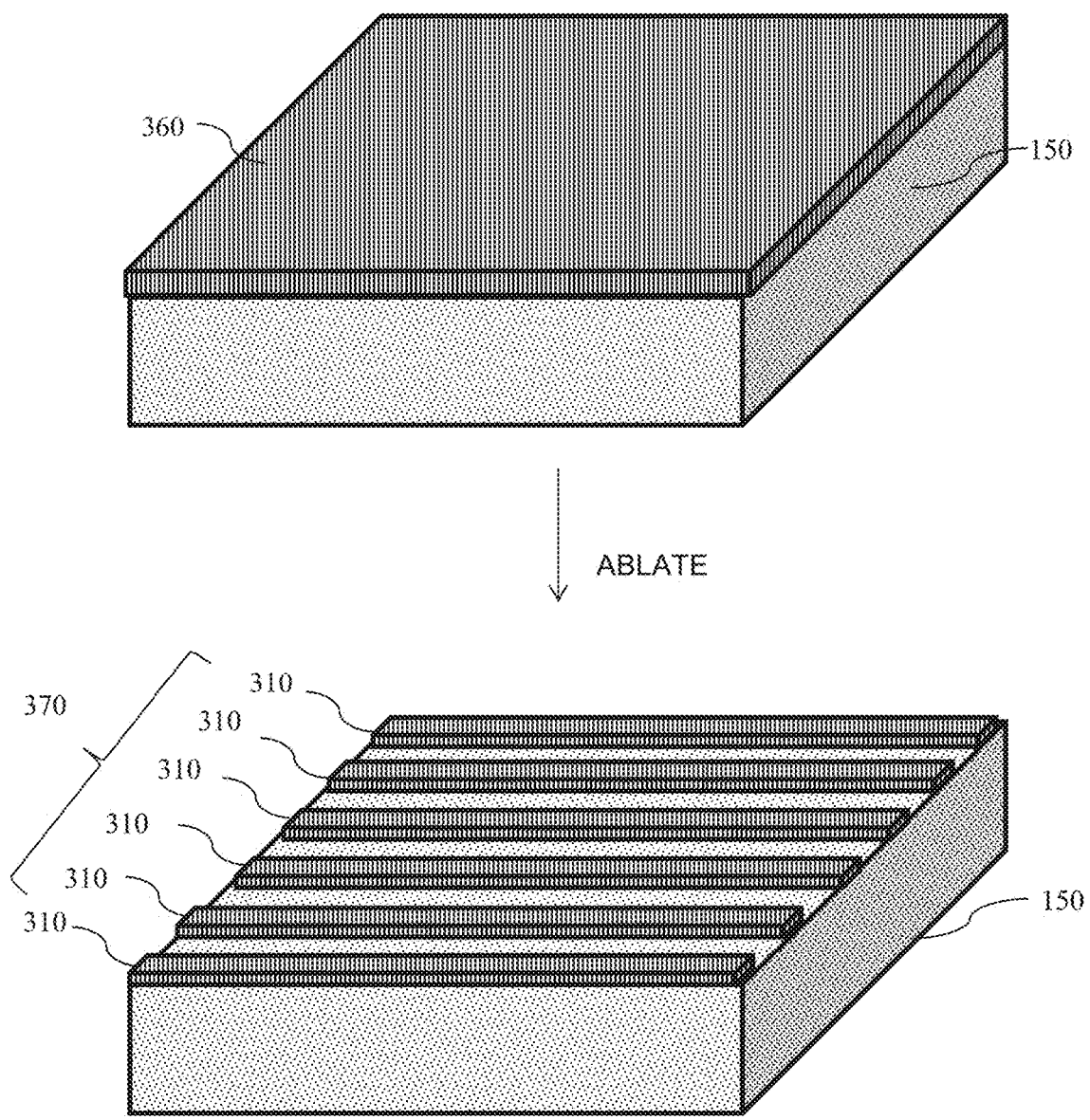

FIGS. 17 and 18 show two different views of an illustrative process through which a thermoplastic polymer can be layered upon the conductive material of a bipolar plate and then undergo ablation to define flow channels. As shown in FIGS. 17 and 18, a thermoplastic polymer is applied as substantially continuous layer 360 upon the surface of a conductive material that is to become bipolar plate 150. The thermoplastic polymer can then undergo at least partial thermal impregnation to adhere the thermoplastic polymer to the conductive material. Thereafter, substantially continuous layer 360 can undergo ablation to define discontinuous layer 370. Discontinuous layer 370 can include blocking material 310 in strips that define open flow channels in the bipolar plate. Disposition of the thermoplastic polymer within substantially continuous layer 360 can take place manually or in any automated or semi-automated manner. For example, in some embodiments, a thermoplastic polymer can be fed from a rolled source in a continuous production line. In other embodiments, a thermoplastic polymer can be layered upon bipolar plate 150 in a liquid form, such as a melt or solution of thermoplastic polymer applied from a print head, sprayer or like deposition source. Liquid forms of other blocking materials, such as epoxies, can also be applied and ablated similarly.

Both the additive and subtractive methods for defining flow channels in a bipolar plate are compatible with incorporation in continuous production lines for producing electrochemical cells. In more specific embodiments, an electrochemical cell can be fabricated from rolled source materials in the continuous production line. In some embodiments, the composite and the flow channels therein can also be formed in the continuous production line before fabricating the electrochemical cell. In other embodiments, the composite and the flow channels therein can be formed in a separate production line, which can be respooled before being introduced to the production line forming the electrochemical cell.

Figure 19:
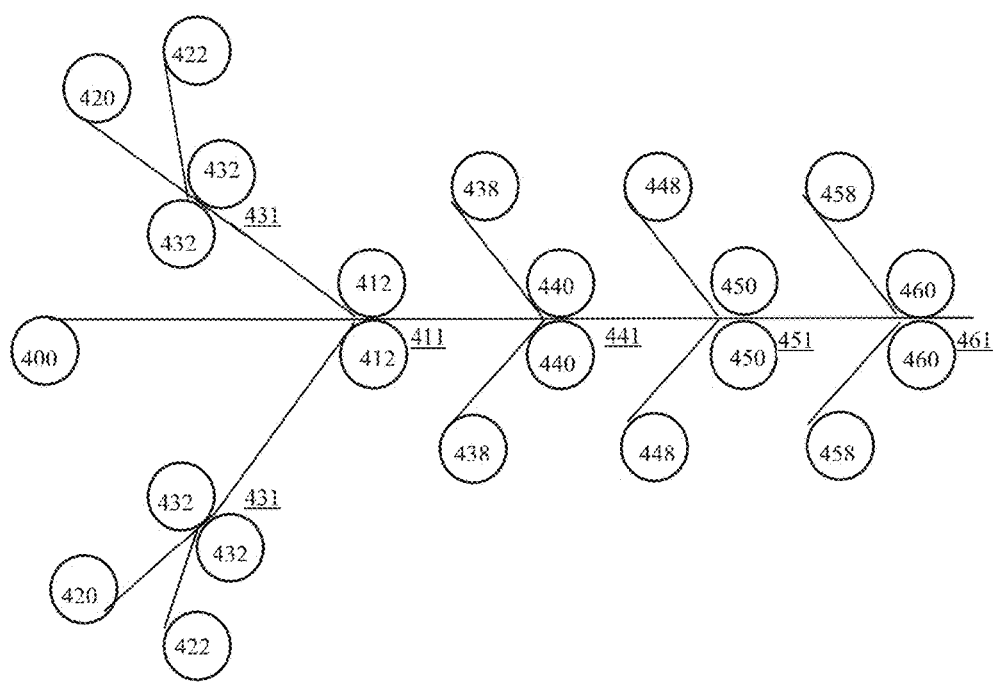
FIGS. 19 and 20 show generalized schematics of illustrative continuous production lines that can be used to define flow channels in a bipolar plate and assemble an electrochemical cell therefrom.
Figure 20:
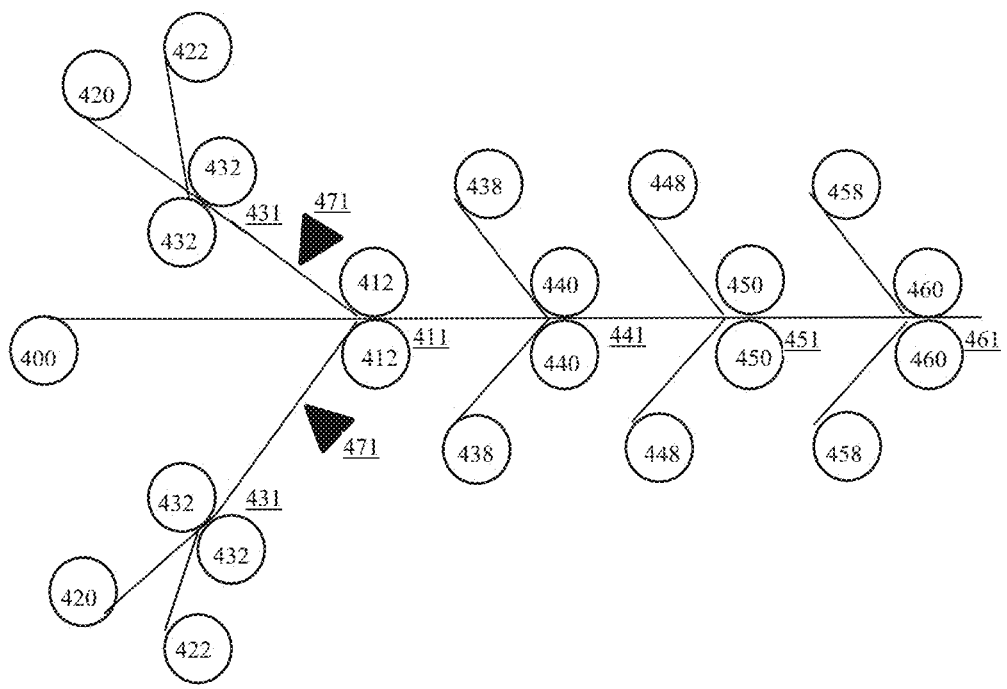

FIGS. 19 and 20 show generalized schematics of illustrative continuous production lines that can be used to define flow channels in a bipolar plate and assemble an electrochemical cell therefrom. As shown in FIG. 19, a separator material is provided from reel 400 and is fed to station 411. Reels 420 supply a conductive material to station 431, and reels 422 supply a thermoplastic polymer in strip form to station 431. Station 431 contains rollers 432, and thermal impregnation of the thermoplastic polymer into the conductive material occurs there. The resulting composite is then fed to station 411 and passes through reels 412, wherein lamination of the bipolar plate and the separator takes place. The resulting laminate then exits station 411 and is fed sequentially fed to stations 441, 451 and 461, respectively containing rollers 440, 450 and 460, where various frame layers are applied to form the electrochemical cell. Materials for forming the various frame layers are supplied from reels 438, 448 and 458. It is to be understood that the foregoing schematic is of a generalized nature, and there may be various additional process operations conducted therein that have been omitted in the interest of brevity. Such process operations can include, for example, die cutting, laser cutting, stamping, and the like.

FIG. 20 differs from FIG. 19 primarily in that FIG. 20 also includes station 471, wherein ablation of the thermoplastic material to define the flow channels occurs. As shown in FIG. 20, ablation takes place prior to lamination of the bipolar plate to the separator.

Where not otherwise defined hereinabove or understood by one having ordinary skill in the art, the definitions in the following paragraphs will be applicable to the present disclosure.

As used herein, the term "energy density" will refer to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" will refer to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and N are as defined above.

As used herein, the term "current density" will refer to the total current passed in an electrochemical cell divided by the geometric area of the electrodes of the cell and is commonly reported in units of $mA/cm^2$.

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode ($\times 100\%$). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using equation 4:

$$V_{eff,RT} = V_{discharge}/V_{charge} \times 100\% \quad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. An electrochemical cell comprising:
an ionically conductive separator disposed between a first half-cell and a second half-cell; and
a first bipolar plate in the first half-cell and a second bipolar plate in the second half-cell, at least one of the first bipolar plate and the second bipolar plate being a porous composite comprising a porous conductive material and a blocking material;
wherein the porous conductive material provides less of an impediment to fluid flow than does the blocking material;
wherein the blocking material comprises a thermoplastic polymer;
wherein the blocking material defines a plurality of flow channels that are spaced apart from one another and extend laterally through the composite with respect to the ionically conductive separator;
wherein the plurality of flow channels are in fluid communication with one another through the porous composite;
wherein at least one of the plurality of flow channels has an inlet but no outlet and at least one of the plurality of flow channels has an outlet but no inlet; and
wherein at least some of the plurality of flow channels optionally contain the porous conductive material.

2. The electrochemical cell of claim 1, wherein the porous conductive material comprises a non-woven carbon paper, a woven carbon cloth, a carbon felt, or a carbon foam.

3. The electrochemical cell of claim 1, wherein the plurality of flow channels are substantially parallel to one another in the composite.

4. The electrochemical cell of claim 1, further comprising:
a first electrode in the first half-cell and a second electrode in the second half-cell, the first electrode intervening between the first bipolar plate and the ionically conductive separator, and the second electrode intervening between the second bipolar plate and the ionically conductive separator.

5. The electrochemical cell of claim 4, wherein the first bipolar plate is in contact with the first electrode, and the second bipolar plate is in contact with the second electrode.

6. The electrochemical cell of claim 1, wherein the first bipolar plate and the second bipolar plate are in contact with opposing sides of the ionically conductive separator.

7. The electrochemical cell of claim 1, wherein the blocking material is impregnated into the porous conductive material.

8. The electrochemical cell of claim 1, wherein the blocking material comprises a layer upon the porous conductive material.

9. The electrochemical cell of claim 1, further comprising:
a fluid inlet manifold configured to provide a first electrolyte solution to the first bipolar plate and a second electrolyte solution to the second bipolar plate; and
a fluid outlet manifold configured to withdraw the first electrolyte solution from the first bipolar plate and the second electrolyte solution from the second bipolar plate;
wherein the fluid inlet manifold and the fluid outlet manifold are configured to provide and to withdraw the first electrolyte solution and the second electrolyte solution from alternating flow channels within the composite.

10. The electrochemical cell of claim 9, wherein the fluid inlet manifold and the fluid outlet manifold are configured to provide and to withdraw the first electrolyte solution and the second electrolyte solution on opposing lateral faces of the first bipolar plate and the second bipolar plate.

11. The electrochemical cell of claim 9, further comprising:
one or more frame layers configured to hold the first bipolar plate in the first half-cell and to provide a fluidic seal therein, and one or more frame layers configured to hold the second bipolar plate in the second half-cell and to provide a fluidic seal therein;
wherein at least one of the frame layers in the first half-cell is configured to provide the first electrolyte solution to the first bipolar plate, and at least one of the frame layers in the second half-cell is configured to provide the second electrolyte solution to the second bipolar plate.

12. The electrochemical cell of claim 1, further comprising:
one or more frame layers configured to hold the first bipolar plate in the first half-cell and to provide a fluidic seal therein, and one or more frame layers configured to hold the second bipolar plate in the second half-cell and to provide a fluidic seal therein.

13. An electrochemical stack comprising:
a plurality of the electrochemical cells of claim 1 abutted together with one another.

14. The electrochemical stack of claim 13, further comprising:
an additional conductive layer disposed between adjacent electrochemical cells.

15. The electrochemical stack of claim 13, wherein the electrochemical stack is present in a flow battery.

16. The electrochemical stack of claim 13, further comprising:
a fluid inlet manifold configured to provide a first electrolyte solution to the first bipolar plate and a second electrolyte solution to the second bipolar plate; and
a fluid outlet manifold configured to withdraw the first electrolyte solution from the first bipolar plate and the second electrolyte solution from the second bipolar plate;
wherein the fluid inlet manifold and the fluid outlet manifold are configured to provide and to withdraw the first electrolyte solution and the second electrolyte solution from alternating flow channels within the porous composite.

17. A method comprising:
impregnating a blocking material into a portion of a porous conductive material to form a porous composite; and fabricating an electrochemical cell comprising a first bipolar plate in a first half-cell and a second bipolar plate in a second half-cell, the first half-cell and the second half-cell being separated by an ionically conductive separator;

wherein the blocking material comprises a thermoplastic polymer;

wherein at least one of the first bipolar plate and the second bipolar plate comprises the porous composite;

wherein the blocking material defines a plurality of flow channels that are spaced apart from one another and extend laterally through the composite with respect to the ionically conductive separator;

wherein the plurality of flow channels are in fluid communication with one another through the porous composite;

wherein at least one of the plurality of flow channels has an inlet but no outlet and at least one of the plurality of flow channels has an outlet but no inlet; and wherein at least some of the plurality of flow channels optionally contain the porous conductive material.

18. The method of claim 17, wherein the electrochemical cell is fabricated from rolled source materials in a continuous production line.

19. The method of claim 18, wherein the composite and the plurality of flow channels therein are also formed in the continuous production line before fabricating the electrochemical cell.

20. The method of claim 17, wherein impregnating the blocking material comprises thermally impregnating the thermoplastic polymer into the conductive material.

21. The method of claim 17, further comprising:
abutting a plurality of the electrochemical cells together with one another to form an electrochemical stack.

22. A method comprising:
disposing a blocking material in a layer upon a porous conductive material to form a porous composite;
removing a portion of the blocking material from the layer to define a plurality of flow channels that are spaced apart from one another; and
fabricating an electrochemical cell comprising a first bipolar plate in a first half-cell and a second bipolar plate in a second half-cell, the first half-cell and the second half-cell being separated by an ionically conductive separator;

wherein the blocking material comprises a thermoplastic polymer;

wherein at least one of the first bipolar plate and the second bipolar plate comprises the composite;

wherein the plurality of flow channels extend laterally through the composite with respect to the ionically conductive separator;

wherein the plurality of flow channels are in fluid communication with one another through the porous composite;

wherein at least one of the plurality of flow channels has an inlet but no outlet and at least one of the plurality of flow channels has an outlet but no inlet; and wherein at least some of the plurality of flow channels optionally contain the porous conductive material.

23. The method of claim 22, wherein the electrochemical cell is fabricated from rolled source materials in a continuous production line.

24. The method of claim 23, wherein the porous composite and the plurality of flow channels therein are also formed in the continuous production line before fabricating the electrochemical cell.

25. The method of claim 22, further comprising:
at least partially impregnating the blocking material into the porous conductive material via thermal impregnation.

26. The method of claim 22, further comprising:
abutting a plurality of the electrochemical cells together with one another to form an electrochemical stack.

27. The method of claim 22, wherein removing a portion of the blocking material comprises laser ablation of the blocking material.

* * * * *